United States Patent
Ye et al.

(10) Patent No.: US 11,237,451 B2
(45) Date of Patent: Feb. 1, 2022

(54) OPTICAL DEVICE, IMAGING DEVICE, FOCUS DRIVING METHOD, AND METHOD FOR MOVING LENS CENTER

(71) Applicant: University of Electronic Science and Technology of China, Sichuan (CN)

(72) Inventors: Mao Ye, Sichuan (CN); Xiaoxi Chen, Sichuan (CN); Guangyong Li, Sichuan (CN); Yalei Zhang, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 0 days.

(21) Appl. No.: 16/988,648

(22) Filed: Aug. 8, 2020

(65) Prior Publication Data
US 2021/0041762 A1    Feb. 11, 2021

(30) Foreign Application Priority Data
Aug. 9, 2019   (CN) .......................... 201910735953.5

(51) Int. Cl.
G02F 1/29    (2006.01)
(52) U.S. Cl.
CPC ................ *G02F 1/29* (2013.01); *G02F 1/294* (2021.01); *G02F 2201/122* (2013.01)
(58) Field of Classification Search
None
See application file for complete search history.

(56) References Cited

U.S. PATENT DOCUMENTS

| | | | |
|---|---|---|---|
| 4,956,705 A * | 9/1990 | Wright | H04N 1/00201 348/50 |
| 10,095,081 B2 * | 10/2018 | Shibuya | G02B 3/14 |
| 2009/0027544 A1 * | 1/2009 | Grewal | H04N 5/23248 348/352 |
| 2012/0211850 A1 * | 8/2012 | Kuboi | H01L 27/14685 257/432 |
| 2014/0028924 A1 * | 1/2014 | Yamaguchi | G03B 17/565 349/1 |
| 2014/0104518 A1 * | 4/2014 | Saitou | G02B 30/27 349/15 |
| 2014/0104545 A1 * | 4/2014 | Miyazawa | G02B 30/27 349/96 |
| 2014/0192298 A1 * | 7/2014 | Sumiyoshi | H04N 13/356 349/96 |
| 2017/0277012 A1 * | 9/2017 | Huh | G02F 1/29 |
| 2018/0210218 A1 * | 7/2018 | Wei | H04N 13/305 |

* cited by examiner

*Primary Examiner* — Ryan Crockett

(57) ABSTRACT

An optical device includes a first electrode layer, a first alignment layer, a liquid crystal layer, a second alignment layer, and a second electrode layer being arranged in turn along a light transmission direction; wherein the first electrode layer comprises a first electrode, a second electrode, and a first impedance membrane arranged between the first electrode and the second electrode, and the first electrode and the second electrode are respectively arranged on opposite ends of the first impedance membrane; the second electrode layer has a structure similar to that of the first electrode layer. The four electrodes form a light transmission hole being shaped as a parallelogram. The present invention solves the problem that the focal length of the liquid crystal lens cannot be accurately adjusted due to the instability of the impedance of the impedance membrane of the present liquid crystal lens.

2 Claims, 29 Drawing Sheets

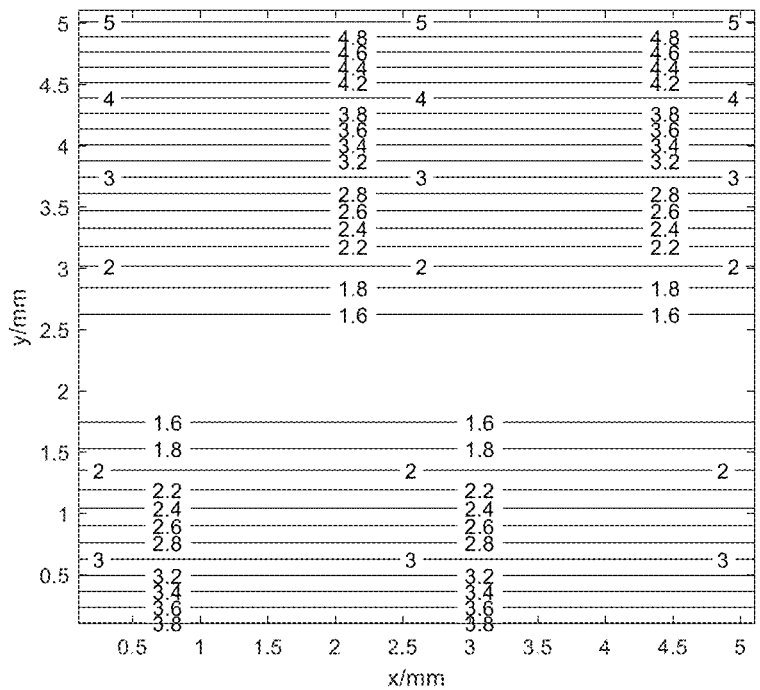
FIG. 53
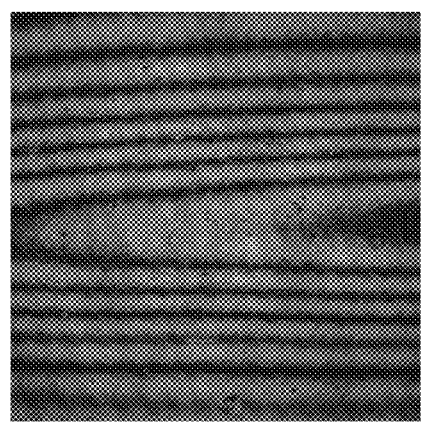 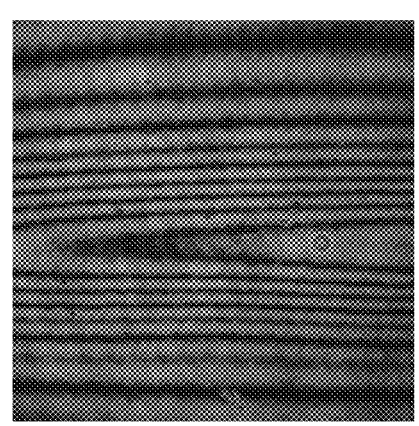
FIG. 54  FIG. 55

OPTICAL DEVICE, IMAGING DEVICE, FOCUS DRIVING METHOD, AND METHOD FOR MOVING LENS CENTER

CROSS REFERENCE OF RELATED APPLICATION

The present invention claims priority under 35 U.S.C. 119(a-d) to CN 201910735953.5, filed Aug. 9, 2019.

BACKGROUND OF THE PRESENT INVENTION

Field of Invention

The present invention generally relates to optical devices, and more particularly, to an optical device, an imaging device, a focus driving method, and a method for moving a lens center.

Description of Related Arts

A liquid crystal lens is an optical device having a focal length which can be changed when an arrangement of liquid crystal molecules is changed by controlling a driving voltage. Liquid crystal molecules have dielectric anisotropy and birefringence effect, in an external electric field, a director orientation of the liquid crystal molecule changes as the electric field changes, and an effective refractive index in the corresponding direction correspondingly changes, thus, the liquid crystal lens can realize the function of convergence and divergence like traditional glass lens. Compared with the traditional glass lens, advantages of the liquid crystal lens include small size and adjustable focal length. However, a typical liquid crystal lens has a relatively-small light transmission hole, which limits the application of the liquid crystal lens in the imaging area.

In order to obtain a liquid lens having a large hole and a good imaging effect, researchers have made great efforts. Japanese scientist S. Sato put forth the concept of liquid crystal lens in the 1970s and made the first electronically-controlled liquid crystal lens in 1979. Then, S. Sato improved the liquid crystal lens and proposed a circular-hole electrode structure. In 1998, Naumov, A. F. et al. proposed the structure of a modal liquid crystal lens (MLCL), which is similar to the circular-hole type of liquid crystal lens. The difference lies in that the modal liquid crystal lens includes a layer of high impedance membrane arranged on the circular-hole ITO electrode to adjust the distribution of the electric field for obtaining the liquid crystal lens with a larger hole and a better optical quality. The focal length of the lens can be adjusted by adjusting the amplitude or frequency of the voltage applied to the liquid crystal lens. In 2002, ye (JJAP 41 (2002) 1571) proposed to use dielectric to separate the porous electrode from the liquid crystal layer, so as to obtain liquid crystal lens with large holes. However, this type of structure caused the problem of an increased driving voltage. In order to reduce the driving voltage, ye (JJAP 49 (2010) 100204) et al. proposed to set a high impedance membrane to separate the porous electrode from the liquid crystal layer to adjust the spatial distribution of the electric field, thus successfully realized the low-voltage driving liquid crystal lens. However, the instability of the high impedance membrane is still unsolved, which is mainly reflected in: at present, the high impedance membrane is mainly made of metal oxides and conductive organic polymers; as the conditions or environments of later processes change, electrical properties of the high impedance membrane change, which further affects the imaging effect of the liquid crystal lens; secondly, electrical properties of the performance of the high impedance membrane changes with time and environmental conditions, resulting in a poor stability of the liquid crystal lens.

In order to solve the problem of instability of high impedance membrane in the structure of liquid crystal lens, the invention patent (Chinese Patent Publication No.: CN109031811A) discloses a liquid crystal optical device with variable focal length and phase delay, as shown in FIG. 1, in the technical solution, the high impedance membrane is deposited in an opening area of a third planar electrode, so that the whole high impedance membrane is enclosed by an insulation layer, a first orientation layer and a third planar electrode to prevent an oxidation state of the high impedance membrane from being changed and thus improve a chemical stability of the high impedance membrane. At the same time, when the device works, a first voltage V1 is applied between the third planar electrode and a second planar electrode, and a second voltage V2 is applied between a first planar electrode and the second planar electrode; since the high impedance membrane has a stable distribution of the electric field distribution laterally and longitudinally, that is, the high impedance membrane has a stable boundary value, thereby ensuring the stability of the liquid crystal optical device in the working state. However, due to the limitation of the production process, it is difficult to produce the impedance membrane with the specified impedance, thus the cost of preparing the liquid crystal optical device according to the technical solution is relatively high. At the same time, even if the high impedance membrane has a stable boundary value, the impedance of the high impedance membrane may change with time in the usage, and the change of the impedance of the high impedance membrane will lead to the uncertainty of focal length adjustment.

SUMMARY OF THE PRESENT INVENTION

Therefore, the present invention provides an optical device, an imaging device, a focus driving method, and a method for moving a lens center, aiming to solve the problem that the focal length of the liquid crystal lens cannot be accurately adjusted due to the instability of the impedance of the impedance membrane in the prior art.

A first aspect of the present invention provides an optical device, including a first electrode layer, a first alignment layer, a liquid crystal layer, a second alignment layer, and a second electrode layer being arranged in turn along a light transmission direction; wherein the first electrode layer includes a first electrode, a second electrode, and a first impedance membrane arranged between the first electrode and the second electrode, and the first electrode and the second electrode are respectively arranged on opposite ends of the first impedance membrane; the second electrode layer includes a third electrode, a fourth electrode, and a second impedance membrane arranged between the third electrode and the fourth electrode, and the third electrode and the fourth electrode are respectively arranged on opposite ends of the second impedance membrane; and the first electrode, the second electrode, the third electrode and the fourth electrode form a light transmission hole being shaped as a parallelogram.

A second aspect of the present invention provides an imaging device, wherein the imaging device includes an optical device including a first electrode layer, a first alignment layer, a liquid crystal layer, a second alignment layer, and a second electrode layer being arranged in turn along alight transmission direction; the first electrode layer includes a first electrode, a second electrode, and a first impedance membrane arranged between the first electrode and the second electrode, and the first electrode and the second electrode are respectively arranged on opposite ends of the first impedance membrane; the second electrode layer includes a third electrode, a fourth electrode, and a second impedance membrane arranged between the third electrode and the fourth electrode, and the third electrode and the electrode are respectively arranged on opposite ends of the second impedance membrane; and the first electrode, the second electrode, the third electrode, and the fourth electrode form a light transmission hole being shaped as a parallelogram.

A third aspect of the present invention provides a focus driving method of an optical device, wherein the optical device includes a first electrode layer, a first alignment layer, a liquid crystal layer, a second alignment layer, and a second electrode layer being arranged in turn along a light transmission direction; the first electrode layer includes a first electrode, a second electrode, and a first impedance membrane arranged between the first electrode and the second electrode, and the first electrode and the second electrode are respectively arranged on opposite ends of the first impedance membrane; the second electrode layer includes a third electrode, a fourth electrode, and a second impedance membrane arranged between the third electrode and the fourth electrode, and the third electrode and the fourth electrode are respectively arranged on opposite ends of the second impedance membrane; and the first electrode, the second electrode, the third electrode and the fourth electrode form a light transmission hole being shaped as parallelogram; and the focus driving method includes:

applying alternating voltages to the first electrode, the second electrode, the third electrode, and the fourth electrode, wherein the liquid crystal layer is in a first lens state; and changing amplitudes or phases of the alternating voltages applied to the first electrode, the second electrode, the third electrode, and the fourth electrode, wherein the liquid crystal is in a second lens state different from the first lens state.

A fourth aspect of the present invention provides a method for moving a lens center of an optical device, wherein the optical device includes the optical device including a first electrode layer, a first alignment layer, a liquid crystal layer, a second alignment layer, and a second electrode layer being arranged in turn along a light transmission direction;

the first electrode layer includes a first electrode, a second electrode, and a first impedance membrane arranged between the first electrode and the second electrode, and the first electrode and the electrode are respectively on opposite ends of the first impedance;

the second electrode layer includes a third electrode, a fourth electrode, and a second impedance membrane arranged between the third electrode and the fourth electrode, and the third electrode and the fourth electrode are respectively arranged on opposite ends of the second impedance membrane; the first electrode, the second electrode, the third electrode, and the fourth electrode form a light transmission hole being shaped as a parallelogram; and the method for moving a lens center of an optical device includes:

applying alternating voltages to the first electrode, the second electrode, the third electrode, and the fourth electrode, wherein the lens center of the optical is in a first position, and a coordinate of the lens center of the optical device is:

$$\left( \frac{2V_1[V_1 - V_2\cos(\varphi_1 - \varphi_2)]}{V_1^2 + V_2^2 - 2V_1V_2\cos(\varphi_1 - \varphi_2)} \cdot \frac{L_1}{2}, \frac{2V_3[V_3 - V_4\cos(\varphi_3 - \varphi_4)]}{V_3^2 + V_4^2 - 2V_3V_4\cos(\varphi_3 - \varphi_4)} \cdot \frac{L_2}{2} \right),$$

changing $V_1$, $V_2$, $V_3$, $V_4$, $\varphi_1$, $\varphi_2$, $\varphi_3$ and/or $\varphi_4$ such that the lens center of the optical device is in a second position, wherein $L_1$ is a distance between the first electrode and the second electrode, $L_2$ is a distance between the third electrode and the fourth electrode, $V_1$ and $\varphi_1$ are respectively an amplitude and an initial phase of the alternating voltage obtained from the first electrode, $V_2$ and $\varphi_2$ are respectively an amplitude and an initial phase the alternating voltage obtained from the second electrode, $V_3$ and $\varphi_3$ are respectively an amplitude and an initial phase of the alternating voltage obtained from the third electrode, and $V_4$ and $\varphi_4$ are respectively an amplitude and an initial phase of the alternating voltage obtained from the fourth electrode.

As mentioned above, beneficial effects of the present are as follows.

Firstly, the spatial distribution of the electric field in the liquid crystal layer of the optical device is not related with the value of the impedance of the impedance membrane, but only is related with the uniformity of the impedance of the impedance membrane. Since it is relatively easy to ensure the uniformity of the impedance of the impedance membrane during the production process, and the uniformity of the impedance of the impedance membrane is slightly affected by aging effect, thus, the stability of the voltage distribution of the optical device of the present invention can be easily ensured and thus the focal distance of the optical device can be stably adjusted.

Secondly, the light transmission hole is shaped as parallelogram, thus, the director of the liquid crystal molecules can realize the Gauss phase distribution in a relatively-large light transmission hole range, which ensures the focus varying effect of the optical device as well as enlarges the light transmission hole of the optical device.

Thirdly, since the light transmission hole is shaped as parallelogram, compared with the conventional optical device with a circular light transmission hole, the light transmission hole of the present invention has a larger duty ratio and thus has a higher utilization rate of optical energy.

BRIEF DESCRIPTION OF THE DRAWINGS

The present invention will be described in more detail with reference to the accompany drawings and the embodiments, wherein in the drawings:

FIG. 53 is a schematic view showing a distribution of equipotential lines in a liquid crystal layer of an optical device of example 29;

FIG. 54 is an interference fringe pattern obtained from an optical device of example 30;

FIG. 55 is an interference fringe pattern obtained from an optical device of example 31;

ILLUSTRATION OF THE REFERENCE NUMBERS

Figure 1:
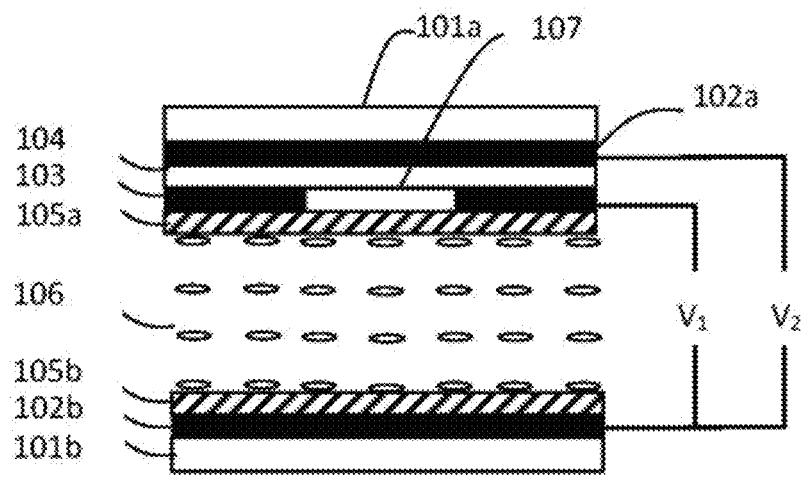
FIG. 1 is a view showing the working principle of a present liquid crystal lens.
Figure 2:
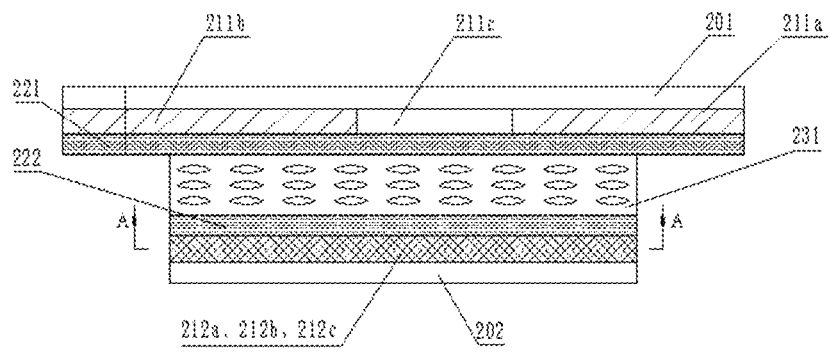
FIG. 2 is a schematic view of an optical device in accordance with a first embodiment of the present invention.
Figure 3:
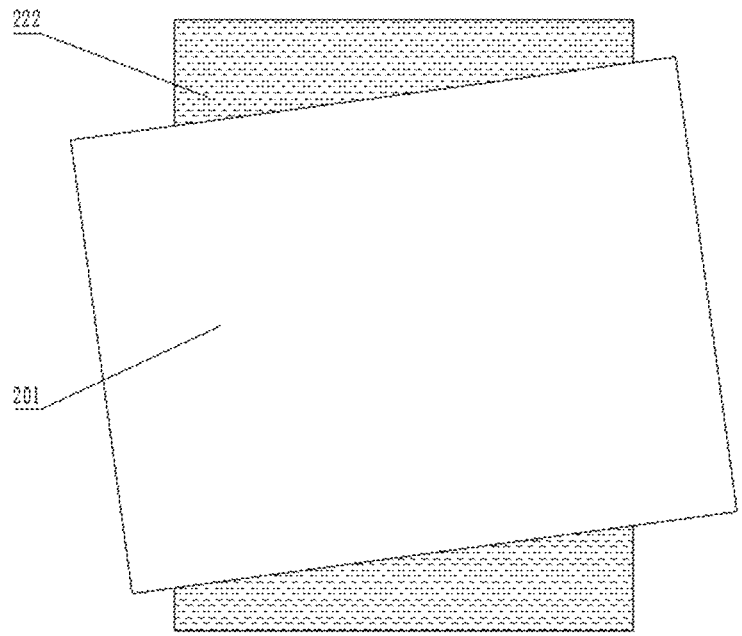
FIG. 3 is a top view of the optical device of FIG. 2.
Figure 4:
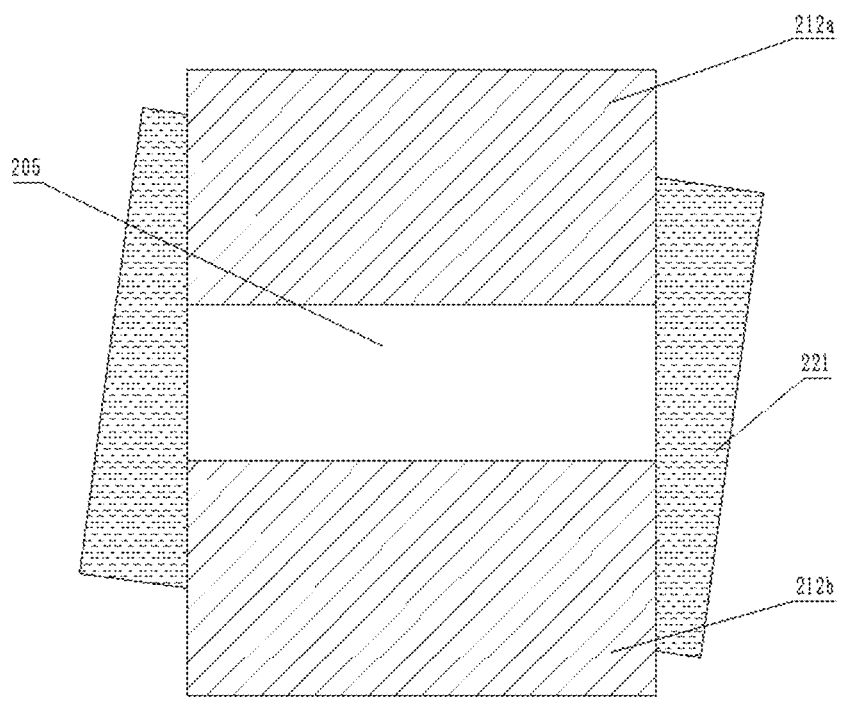
FIG. 4 is a cross-sectional view of the optical device of FIG. 2 along the line A-A.

101a, a third substrate; 101b, a fourth substrate; 102a, a first planar electrode; 102b, a second planar electrode; 103, a third planar electrode; 104, an insulating layer; 105a, a first alignment layer; 105b, a second alignment layer; 106, a first liquid crystal layer; 107, an impedance membrane layer; 201, a first substrate; 202, a second substrate; 211a, a first electrode; 211b, a second electrode; 211c, a first impedance membrane; 212a, a third electrode; 212b, a fourth electrode; 212c, a second impedance membrane; 221, a first alignment layer; 222, a second alignment layer; 231, a liquid crystal layer; 203, a first protection layer; 204, a second protection layer; and 205, a light transmission hole.

DETAILED DESCRIPTION OF THE PREFERRED EMBODIMENT

To describe the technical solutions in the embodiments of the present invention more clearly, the following briefly introduces the accompanying drawings required for describing the embodiments. It should be understood that the described specific embodiments herein are only used to explain the present invention, but are not to limit the present invention. For a person skilled in the art, the present invention can be implemented without some details in some embodiments. The following illustrations of various embodiments are only used to show examples of the present invention for better understanding of the present invention.

The relationship terms used in the text of this application, such as first and second, are only for distinguishing an object or operation from another object or operation, but not for defining or implying any practical relation or order between the object or operation. The terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment.

First Embodiment

As shown from FIG. 2 to FIG. 5, an optical device in accordance with the first embodiment of the present invention includes a first substrate, a first electrode layer, a first alignment layer, a liquid crystal layer, a second alignment layer, a second electrode layer, and a second substrate arranged in turn along a light transmission direction. The first substrate and the second substrate are made of transparent glass. The first alignment layer and the second alignment layer are made of organic polymer or polystyrene, polyvinyl alcohol, epoxy resin or polyimide. An alignment direction of the first alignment layer is anti-parallel with that of the second alignment layer.

The first electrode layer includes a first electrode, a second electrode, and a first impedance membrane arranged between the first electrode and the second electrode. The first electrode and the second electrode are respectively arranged on a left end and a right end of the first impedance membrane. The second electrode layer includes a third electrode, a fourth electrode, and a second impedance membrane arranged between the third electrode and the fourth electrode. The third electrode and the fourth electrode are respectively arranged on a front end and a rear end of the second impedance membrane. The first electrode, the second electrode, the third electrode, and the fourth electrode are made of Al, Pt or Cr. The first electrode, the second electrode, the third electrode, and the fourth electrode form a light transmission hole shaped as a parallelogram along the light transmission direction, and a diagonal of the parallelogram is α.

A focus varying principle of the optical device of the first embodiment is as follows.

Since a director arrangement of liquid crystal material can be electrically adjusted, different gradient distributions of refractive indexes of the liquid crystal material can be formed in a non-uniform electric field. Thus, by applying a voltage with some gradient distribution to the liquid crystal material, the director arrangement of the liquid crystal material can be induced to be non-uniform and light emitted from the liquid crystal layer can have the Gauss phase distribution. In this way, a wavefront of an incident plane wave is bent to form a converged or diverged spherical wave, and the liquid crystal layer thus has a focus varying function of an optical device (the optical device of the first embodiment is an optical lens).

An alternating voltage F(V, t, f, φ) is applied to each electrode, wherein V is an amplitude of the voltage, t is an instantaneous time, f is a frequency of the voltage, and φ is an initial phase of the voltage. F(V, t, f, φ) can be a square wave voltage, a sinusoidal voltage, or a triangular wave voltage. Since any periodic function can be expressed by an infinite series formed by a sine function, for facilitation of discussion, the voltage in the present embodiment is a sinusoidal signal, that is, the voltages respectively applied to the first electrode, the second electrode, the third electrode and the fourth electrode are $F_A(V_1,t,f_1,\varphi_1)$, $F_B(V_2,t,f_2,\varphi_2)$, $F_C(V_3,t,f_3,\varphi_3)$, and $F_D(V_4,t,f_4,\varphi_4)$, wherein:

$$F_A(V_1,t,f_1,\varphi_1) = V_1 \sin(2\pi f_1 t + \varphi_1) \quad (1\text{-}1)$$

$$F_B(V_2,t,f_2,\varphi_2) = V_2 \sin(2\pi f_1 t + \varphi_2) \quad (1\text{-}2)$$

$$F_C(V_3,t,f_3,\varphi_3) = V_3 \sin(2\pi f_3 t + \varphi_3) \quad (1\text{-}3)$$

$$F_D(V_4,t,f_4,\varphi_4) = V_4 \sin(2\pi f_4 t + \varphi_4) \quad (1\text{-}4)$$

Wherein $V_1$, $f_1$ and $\varphi_1$ are respectively an amplitude, a frequency, and an initial phase of a voltage obtained from the first electrode; $V_2$, $f_2$, and $\varphi_2$ are respectively an amplitude, a frequency, and an initial phase of a voltage obtained from the second electrode; $V_3$, $f_3$, and $\varphi_3$ are respectively an amplitude, a frequency, and an initial phase of a voltage obtained from the third electrode; and $V_4$, $f_4$, and $\varphi_4$ are respectively an amplitude, a frequency, and an initial phase of a voltage obtained from the fourth electrode.

Figure 5:
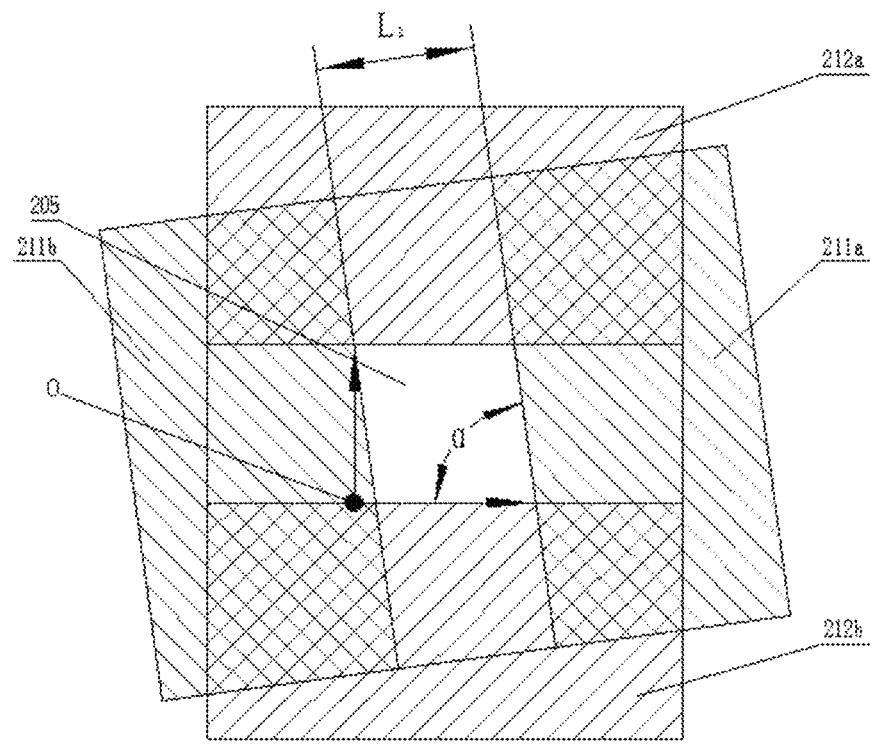
FIG. 5 is a projection view of each electrode of the optical device along a light transmission direction in accordance with the first embodiment of the present invention.
Figure 6:
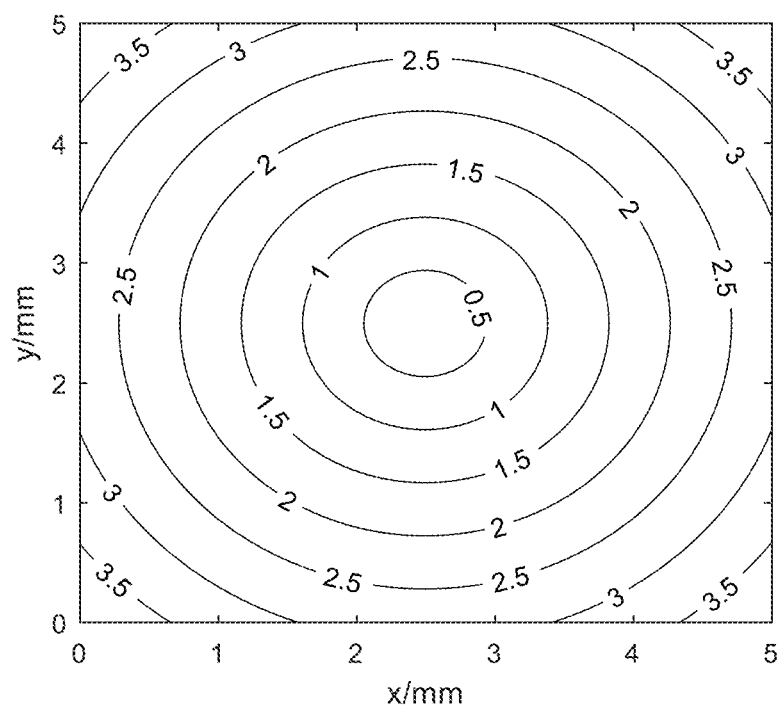
FIG. 6 is a simulated view showing a distribution of equipotential lines in a liquid crystal layer when a diagonal angle α of a quadrilateral light transmission hole in the optical device is 90 degrees in accordance with the first embodiment of the present invention.
Figure 7:
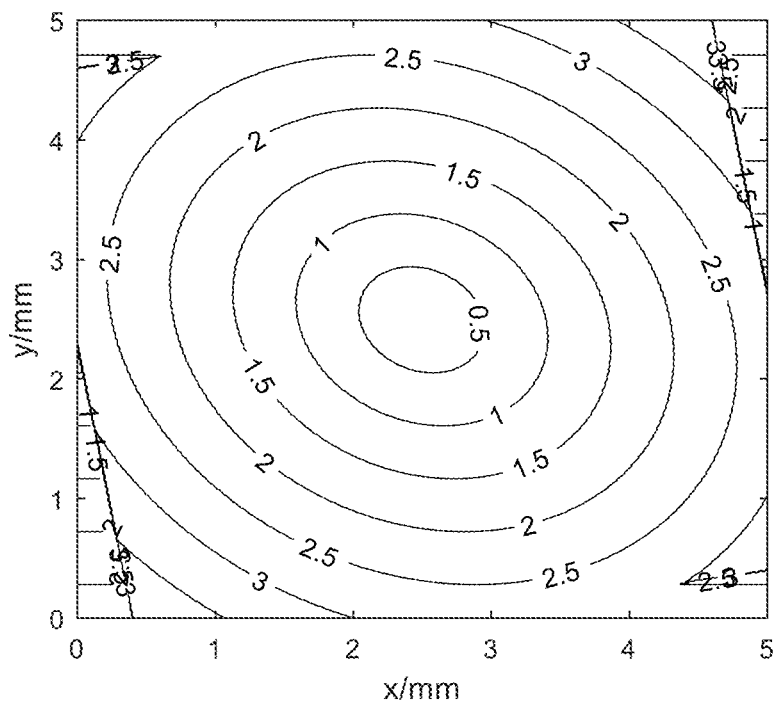
FIG. 7 is a simulated view showing a distribution of equipotential lines in a liquid crystal layer when a diagonal angle α of a quadrilateral light transmission hole in the optical device is 80 degrees in accordance with the first embodiment of the present invention.
Figure 8:
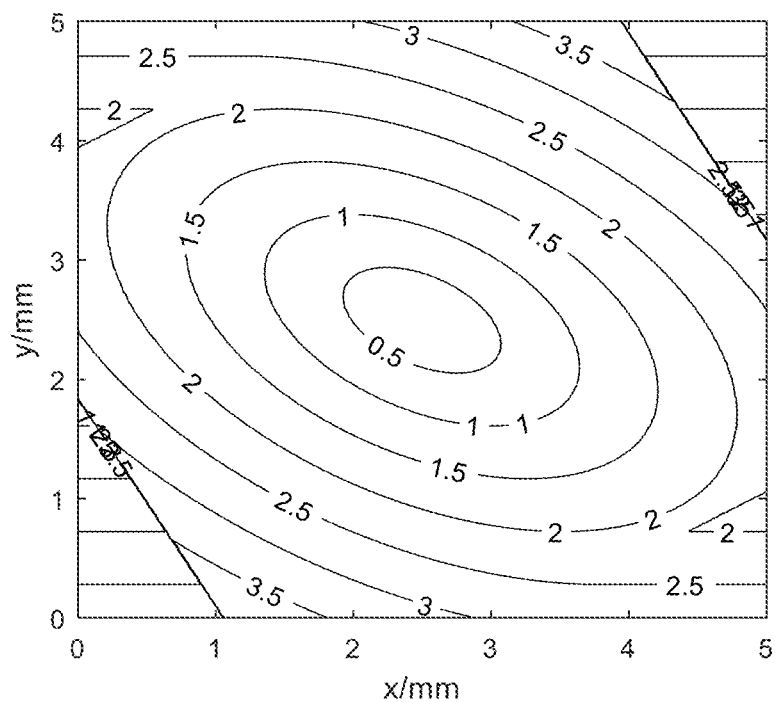
FIG. 8 is a simulated view showing a distribution of equipotential lines in a liquid crystal layer when a diagonal angle α of a quadrilateral light transmission hole in the optical device is 60 degrees in accordance with the first embodiment of the present invention.
Figure 9:
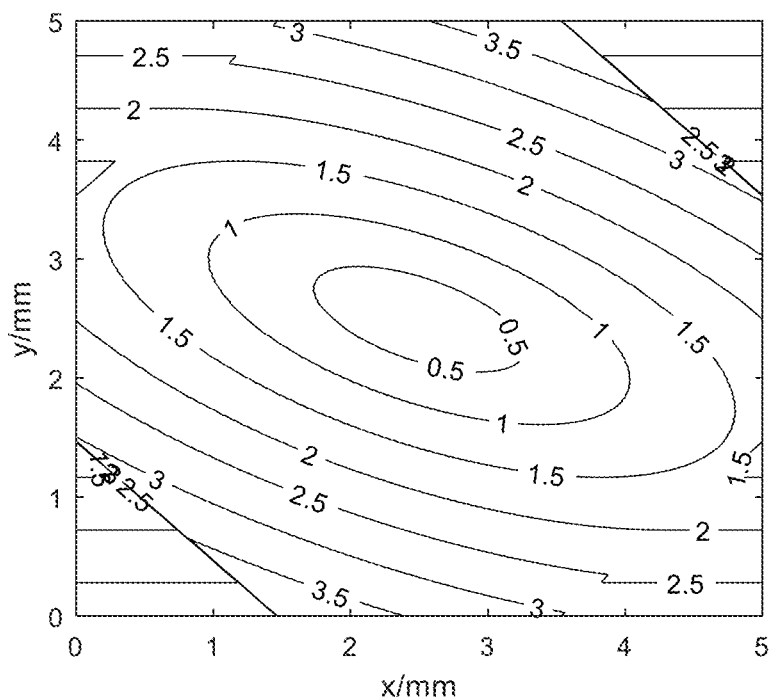
FIG. 9 is a simulated view showing a distribution of equipotential lines in a liquid crystal layer when a diagonal angle α of a quadrilateral light transmission hole in the optical device is 45 degrees in accordance with an embodiment of the present invention.
Figure 10:
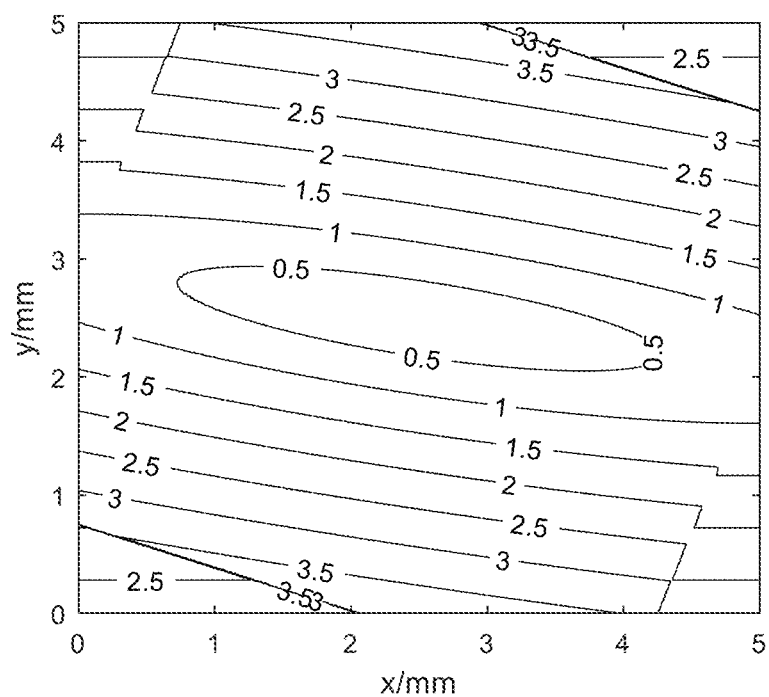
FIG. 10 is a simulated view showing a distribution of equipotential lines in a liquid crystal layer when a diagonal angle α of a quadrilateral light transmission hole in the optical device is 20 degrees in accordance with the first embodiment of the present invention.
Figure 11:
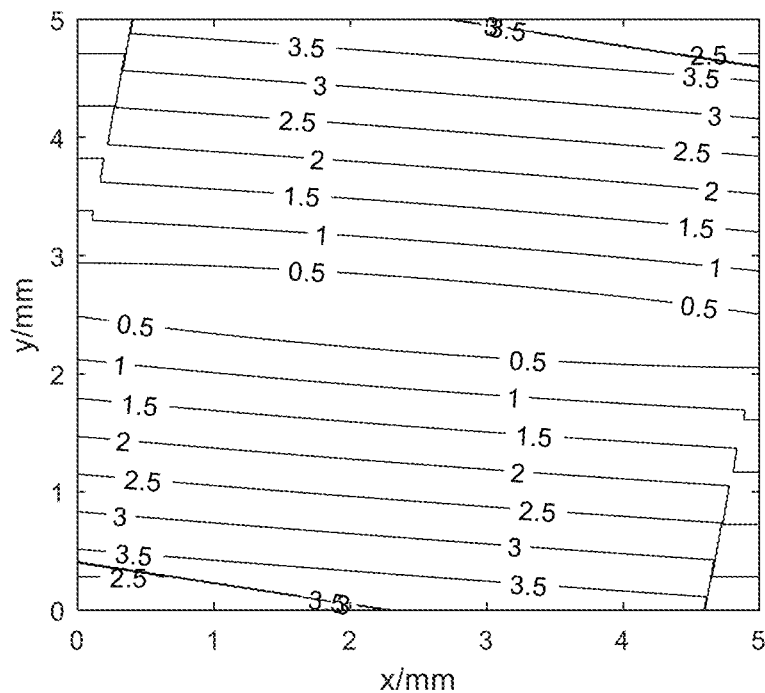
FIG. 11 is a simulated view showing a distribution of equipotential lines in a liquid crystal layer when a diagonal angle α of a quadrilateral light transmission hole in the optical device is 10 degrees in accordance with the first embodiment of the present invention.
Figure 12:
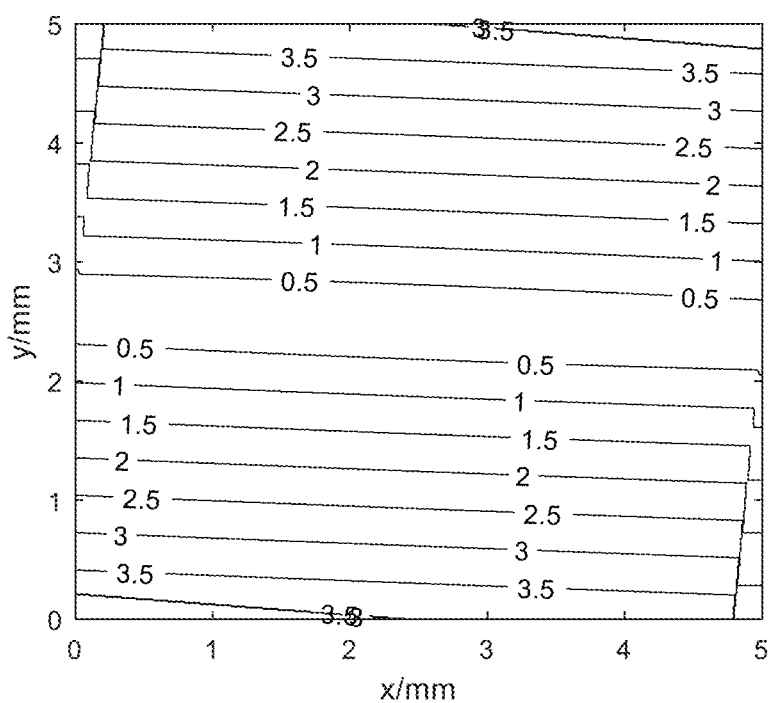
FIG. 12 is a simulated view showing a distribution of equipotential lines in a liquid crystal layer when a diagonal angle α of a quadrilateral light transmission hole in the optical device is 5 degrees in accordance with the first embodiment of the present invention.
Figure 13:
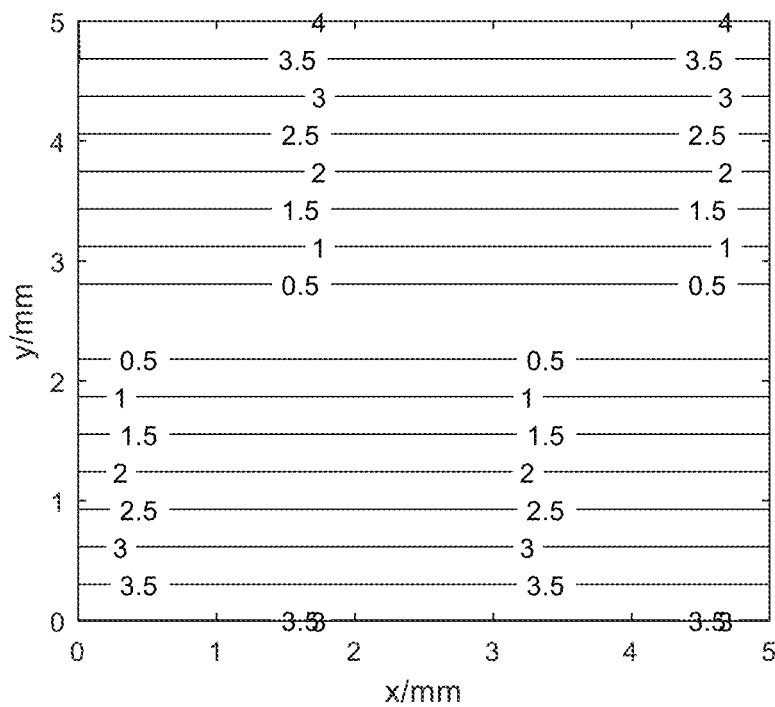
FIG. 13 is a simulated view showing a distribution of equipotential lines in a liquid crystal layer when a diagonal angle α of a quadrilateral light transmission hole in the optical device is 0 degrees in accordance with the first embodiment of the present invention.

Supposed that a potential applied to the first/second substrate is in a linear distribution from the first/third electrode to the second/fourth electrode. As shown in FIG. 5, a distance between the first electrode and the second electrode is $L_1$, a distance between the third electrode and the fourth electrode is $L_2$. Building a coordinate system by taking the point 0 in FIG. 5 as a coordinate origin, a direction from the first electrode to the fourth electrode as a y axis, a direction perpendicular to the y axis as a x axis, then a potential distribution $V_{up}$ on an upper substrate (the first substrate) and a potential distribution $V_{down}$ on a lower substrate (the second substrate) are:

$$V_{up} = V_1 \sin(2\pi f_1 t + \varphi_1) + \frac{x}{L_1}[V_2 \sin(2\pi f_2 t + \varphi_2) - V_1 \sin(2\pi f_1 t + \varphi_1)] \quad (1\text{-}5)$$

$$V_{down} = V_3 \sin(2\pi f_3 t + \varphi_3) + \frac{y}{L_2}[V_4 \sin(2\pi f_4 t + \varphi_4) - V_3 \sin(2\pi f_3 t + \varphi_3)] \quad (1\text{-}6)$$

A potential difference U between the upper substrate and the lower substrate is:

$$U = V_{up} - V_{down} \quad (1\text{-}7)$$

An effective voltage applied to the liquid crystal in a period T is:

$$V_{rms} = \sqrt{\frac{\int_0^T [U(V_1,V_2,V_3,V_4,f_1,f_2,f_3,f_4,\varphi_1,\varphi_2,\varphi_3,\varphi_4,t)]^2 dt}{T}} \quad (1\text{-}8)$$

That is, the effective voltage applied to the liquid crystal layer is related with the amplitude ($V_1$, $V_2$, $V_3$, $V_4$) of the voltage, the frequency ($f_1$, $f_2$, $f_3$, $f_4$) of the voltage, and phases ($\varphi_1$, $\varphi_2$, $\varphi_3$, $\varphi_4$) of the voltage, that is:

$$V_{rms} = V_{rms}(V_1,V_2,V_3,V_4,f_1,f_2,f_3,f_4,\varphi_1,\varphi_2,\varphi_3,\varphi_4) \quad (1\text{-}9)$$

From the above formula, it can be concluded that a spatial distribution of the electric field in the liquid crystal layer is not related with a value of an impedance of the impedance membrane, thus, the change of the value of the impedance of the impedance membrane does not affect the spatial distribution of the electric field in the liquid crystal layer.

Meanwhile, the optical device can be driven to change focal distance by changing at least one of the amplitude, the frequency, or the phase of each alternating voltage. Further, the director of the liquid crystal molecules can realize the Gauss phase distribution in a relatively-large light transmission hole range, which ensures the focus varying effect of the optical device as well as enlarges the light transmission hole of the optical device.

All the above formulas are obtained by assuming that the potential lines are evenly distributed on the substrate (that is, the impedance of the impedance membrane is even), and the final formula (1-8) shows that the spatial distribution of the electric field in the liquid crystal layer of the optical device (lens) is not related with the value of the impedance of the impedance membrane, but is only related with the uniformity of the impedance of the impedance membrane. Since it is relatively easy to ensure the uniformity of the impedance of the impedance membrane during the production process, and the uniformity of the impedance of the impedance membrane is slightly affected by aging effect, thus, the stability of the voltage distribution of the optical device of the present invention can be easily ensured and thus the focal distance of the optical device can be stably adjusted.

$L_1$ and $L_2$ of the optical device of the first embodiment are set to be $L_1$=5 mm, $L_2$=5 mm. Voltages are respectively applied to the electrodes such that each electrode is in a first voltage state, that is, $V_1$=$V_2$=$V_3$=$V_4$=4V, $f_1$=$f_2$=1 kHz, $f_3$=$f_4$=2 kHz, $\varphi_1$=$\varphi_4$=180°, $\varphi_2$=$\varphi_3$=0°. According to the formula (1-8), the effective voltage distribution in the crystal layer when α is 90 degrees can be calculated and the distribution of the equipotential lines can be further drawn. The effective voltage distribution with different α can be simulated. In detail, the potential distribution $V_{up}$ on the substrate is selected as a rotation target and a time axis of the three-dimensional data $V_{up}$ is selected as a rotation axis, and a rotation angle can be customized to simulate the distribution of $V_{up}$ with different α. By plugging all the values into the formula (1-8), the effective voltage distribution and the distribution of equipotential lines in the liquid crystal layer can be obtained.

The simulated view of the distribution of equipotential lines in the liquid crystal layer when the diagonal angle α of the quadrilateral light transmission hole in the optical device is 90°, 80°, 45°, 30°, 20°, 10°, 5°, and 0° is as shown in FIG. 6 to FIG. 13 (when the diagonal angle α is 90°, it indicates that in a plane perpendicular to a light transmission direction, a direction from the first electrode to the second electrode is perpendicular to a direction from the third electrode to the fourth electrode; when the diagonal angle α decreases, it indicates the direction from the first electrode to the second electrode is counterclockwise rotated relative to the direction from the third electrode to the fourth electrode, the first substrate and the first alignment layer are simultaneously rotated, and the diagonal angle α is complementary with the counterclockwise rotated angle; when the diagonal angle α is 0 degrees, it indicates that the direction from the first electrode to the second electrode is parallel with the direction from the third electrode to the fourth electrode in the plane perpendicular to the light transmission direction.)

From FIG. 6 to FIG. 13, it can be seen that by applying the voltage to each electrode of the optical device, an axially symmetrical non-uniform electric field is generated in the liquid crystal layer of the optical device, thereby causing an axially symmetrical non-uniform orientation of the director of the liquid crystal molecules in the liquid crystal layer, thus, an effective refractive index of the liquid crystal layer is distributed as the refractive index of an optical lens.

Example 1

Figure 14:
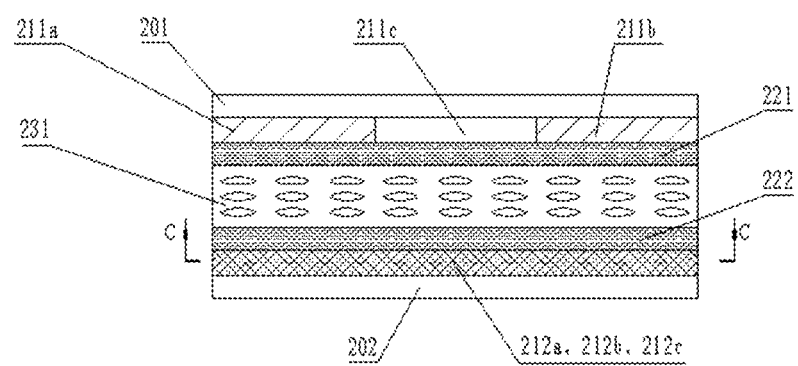
FIG. 14 is a schematic view of an optical device of example 1.
Figure 15:
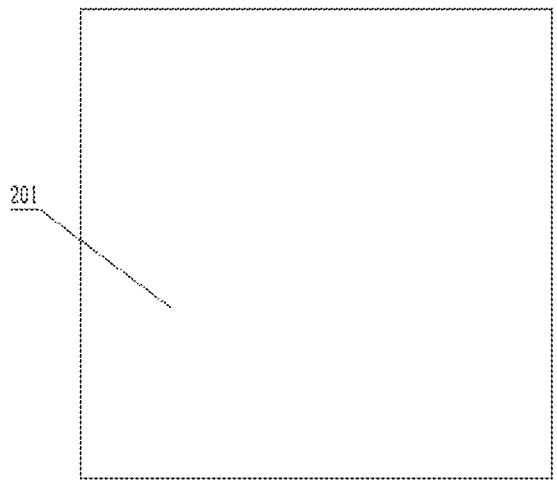
FIG. 15 is a top view of the optical device of FIG. 14.
Figure 16:
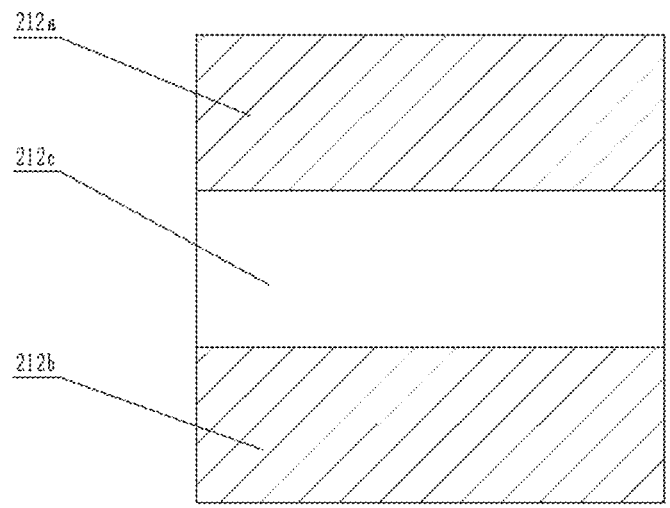
FIG. 16 is a cross-sectional view of the optical device of FIG. 14 along the line C-C.

As shown from FIG. 14 to FIG. 16, in example 1, an optical device includes a first substrate, a first electrode layer, a second substrate, a first alignment layer, a liquid crystal layer, a second electrode layer, and a second substrate arranged in turn from top to bottom. A rubbing direction of the first alignment layer is anti-parallel with that of the second alignment layer. Projections of the first substrate, the first electrode layer, the first alignment layer, the liquid crystal layer, the second alignment layer, the second electrode layer, and the second substrate along a light transmission direction are squares of same sizes.

The first electrode layer includes a first electrode, a first impedance membrane, and a second electrode. The first electrode and the second electrode are respectively arranged on a left side and a right side of the first impedance membrane. The left side of the first impedance membrane is connected to the first electrode and the right side of the first impedance membrane is connected to the second electrode. The second electrode layer includes a third electrode, a second impedance membrane, and a fourth electrode. The third electrode and the fourth electrode are respectively arranged on a front side and a rear side of the second impedance membrane. A left side of the second impedance membrane is connected to the third electrode and a right side of the second impedance membrane is connected to the fourth electrode.

Figure 17:
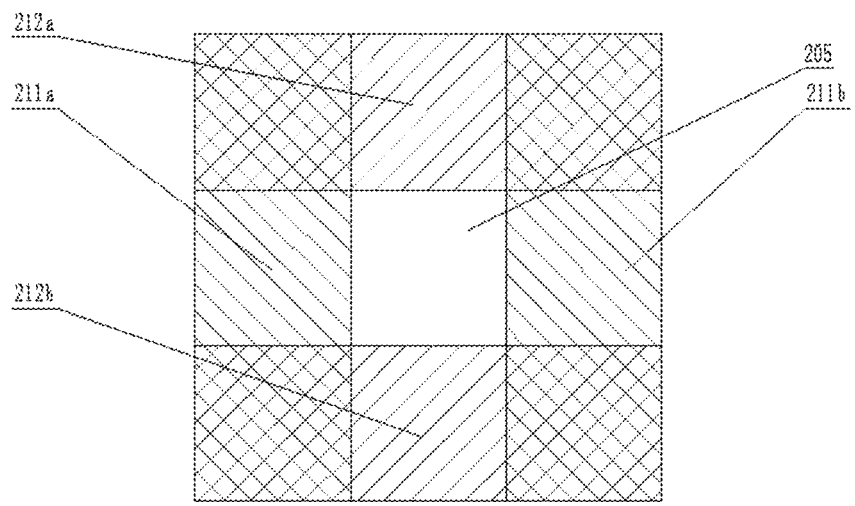
FIG. 17 is a projection view of each electrode of the optical device along a light transmission direction of example 1.

As shown in FIG. 17, projections of the first electrode, the second electrode, the third electrode, and the fourth electrode along the light transmission direction form a square (that is, a diagonal angle α of a parallelogram is 90 degrees).

Example 2

Figure 18:
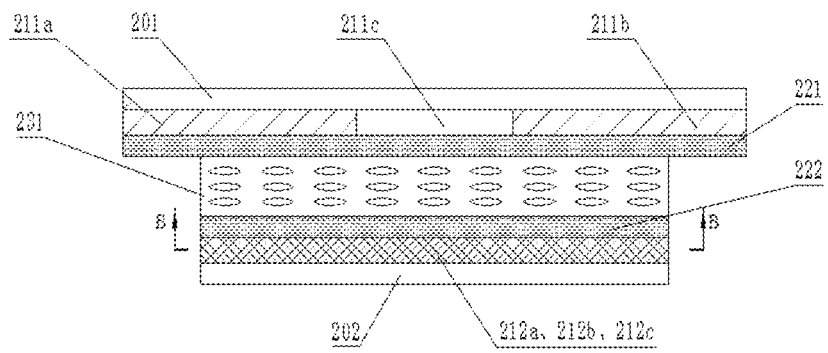
FIG. 18 is a schematic view of an optical device of example 2.
Figure 19:
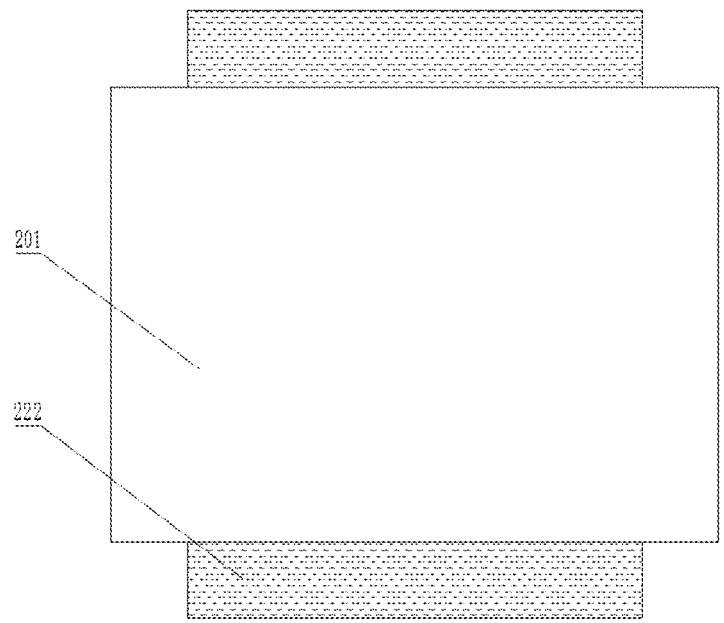
FIG. 19 is a top view of the optical device of FIG. 18.
Figure 20:
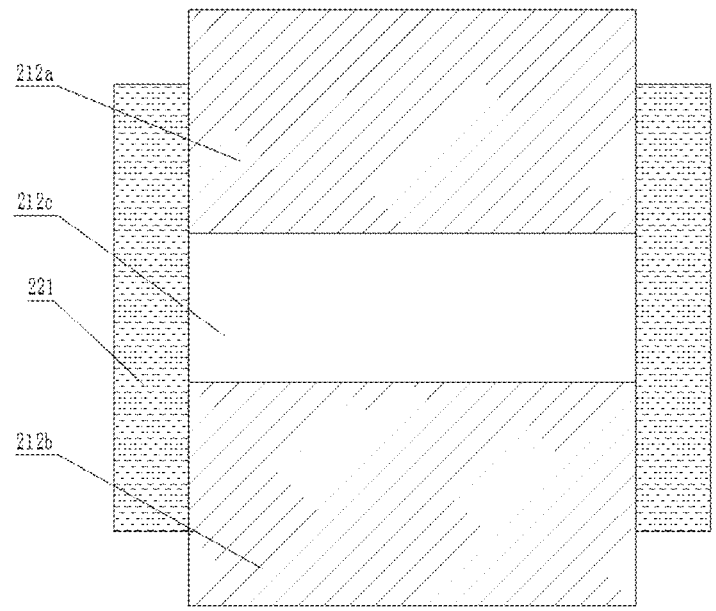
FIG. 20 is a cross-sectional view of the optical device of FIG. 18 along line C-C.

As shown from FIG. 18 to FIG. 20, an optical device of example 2 includes a first substrate, a first electrode layer, a first alignment layer, a liquid crystal layer, a second alignment layer, a second electrode layer, and a second substrate arranged in turn from top to bottom. A rubbing direction of the first alignment layer is anti-parallel with that of the second alignment layer.

The first electrode layer includes a first electrode, a first impedance membrane, and a second electrode. The first electrode and the second electrode are respectively arranged on a left side and a right side of the first impedance membrane. The left side of the first impedance membrane is connected to the first electrode and the right side of the first impedance membrane is connected to the second electrode. The second electrode layer includes a third electrode, a second impedance membrane, and a fourth electrode. The third electrode and the fourth electrode are respectively arranged on a front side and a rear side of the second impedance membrane. A left side of the second impedance membrane is connected to the third electrode and a right side of the second impedance membrane is connected to the fourth electrode.

Projections of the first substrate, the first electrode layer, the first alignment layer, the second alignment layer, the second electrode layer, and the second substrate along a light transmission direction are rectangles of same sizes, and a projection of the liquid crystal layer along the light transmission direction is a square. Lengths of the first electrode layer, the first alignment layer, and the second alignment layer are respectively arranged along a left-right direction, and lengths of the second alignment layer, the second electrode layer, and the second substrate are respectively arranged along a front-rear direction, thus, a projection of a left end of the first electrode and a projection of a right end of the second electrode extend outside a projection of the second substrate, a projection of a front end of the third electrode and a projection of a rear end of the fourth electrode extend outside a projection of the first substrate. With the configuration, compared with example 1, one end of each electrode of the optical device of example 2 extends outwards to be used as a connecting terminal, allowing for an easy connection between a lead wire and the electrode.

Figure 21:
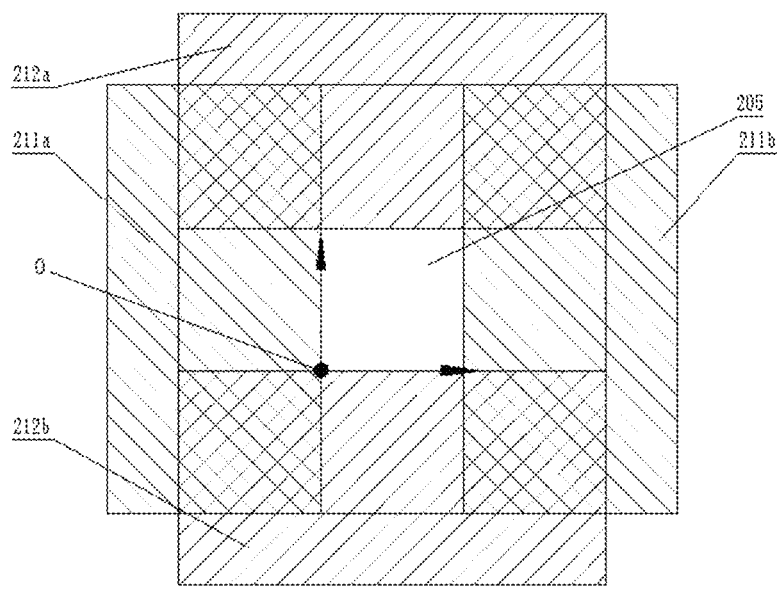
FIG. 21 is a projection view of each electrode of the optical device along a light transmission direction of example 2.

As shown in FIG. 21, projections of the first electrode, the second electrode, the third electrode, and the fourth electrode along the light transmission direction (that is, a direction perpendicular to a surface of the liquid crystal layer) form a square (that is, a diagonal angle α of a parallelogram is 90 degrees). Voltages in the formulas (1-1), (1-2), (1-3), and (1-4) are respectively applied to the first electrode, the second electrode, the third electrode, and the fourth electrode.

In order to simulate the distribution of the equipotential lines in the liquid crystal layer of the optical device of example 2, the formulas (1-1), (1-2), (1-3), and (1-4) are simplified with $\varphi_{12}=\varphi_1-\varphi_2$, $\varphi_{34}=\varphi_3-\varphi_4$, $f_1=f_2$, $f_3=f_4$, and $f_1 \neq f_3$. That is, frequencies of the voltages applied to an upper substrates are equal to each other, frequencies of the voltages applied to a lower substrate are equal to each other, and the frequencies of the voltages applied to the upper substrate are different from the frequencies of the voltages applied to the lower substrate; and a phase difference between the voltages applied to the upper substrate is $\varphi_{12}$, and a phase difference between the voltages applied to the lower substrate is $\varphi_{34}$, thus, the formulas (1-1), (1-2), (1-3), and (1-4) are simplified as:

$$F_A(V_1, t, f_1, 0) = V_1 \sin(2\pi f_1 t) \tag{1-10}$$

$$F_B(V_2, t, f_1, \varphi_{12}) = V_2 \sin(2\pi f_1 t + \varphi_{12}) \tag{1-11}$$

$$F_C(V_3, t, f_3, 0) = V_3 \sin(2\pi f_3 t) \tag{1-12}$$

$$F_D(V_4, t, f_3, \varphi_{34}) = V_4 \sin(2\pi f_3 t + \varphi_{34}) \tag{1-13}$$

Building a coordinate system by taking the point 0 in FIG. 21 as a coordinate origin, a direction from the third electrode to the fourth electrode as a y axis, a direction perpendicular to the y axis as an x axis, then a potential distribution $V_{up}$ on the upper substrate and a potential distribution $V_{down}$ on the lower substrate are:

$$V_{up} = V_1 \sin(2\pi f_1 t) + \frac{x}{L_1}[V_2 \sin(2\pi f_1 t + \varphi_{12}) - V_1 \sin(2\pi f_1 t)] \tag{1-14}$$

$$V_{down} = V_3 \sin(2\pi f_3 t) + \frac{y}{L_2}[V_4 \sin(2\pi f_3 t + \varphi_{34}) - V_3 \sin(2\pi f_3 t)] \tag{1-15}$$

-continued $$U = V_1\sin(2\pi f_1 t) + \frac{x}{L_1}[V_2\sin(2\pi f_1 t + \varphi_{12}) - V_1\sin(2\pi f_1 t)] - \qquad (1\text{-}16)$$
$$V_3\sin(2\pi f_3 t) - \frac{y}{L_2}[V_4\sin(2\pi f_3 t + \varphi_{34}) - V_3\sin(2\pi f_3 t)]$$

Followings are set:

$$a = \left(1 - \frac{x}{L_1}\right)V_1, \, b = \frac{x}{L_1}V_2, \, c = -\left(1 - \frac{y}{L_2}\right)V_3, \qquad (1\text{-}17)$$
$$d = -\frac{y}{L_2}V_4, \, V_{rms}^2 = \frac{\int_0^M U^2 dt}{M}$$

Wherein M is a period T of a function U or an integer multiple of the period T.

If $f_1 M$, $f_3 M$ are integers, then:

$$V_{rms}^2 = \frac{a^2}{2} + \frac{b^2}{2} + \frac{c^2}{2} + \frac{d^2}{2} + ab\cos(\varphi_{12}) + cd\cos(\varphi_{34}) \qquad (1\text{-}18)$$

Plugging $$a = \left(1 - \frac{x}{L_1}\right)V_1, \, b = \left[\frac{x}{L_1}V_2\right], \, c = -\left(1 - \frac{y}{L_2}\right)V_3, \, d = -\frac{y}{L_2}V_4$$

into the formula (1-18), then:

$$V_{rms}^2 = \left(\frac{V_1^2}{2L_1^2} + \frac{V_2^2}{2L_1^2} - \frac{V_1 V_2 \cos(\varphi_{12})}{L_1^2}\right)x^2 + \qquad (1\text{-}19)$$
$$\left(-\frac{V_1^2}{L_1} + \frac{V_1 V_2\cos(\varphi_{12})}{L_1}\right)x + \left(\frac{V_3^2}{2L_2^2} + \frac{V_4^2}{2L_2^2} - \frac{V_3 V_4 \cos(\varphi_{34})}{L_2^2}\right)y^2 +$$
$$\left(-\frac{V_3^2}{L_2} + \frac{V_3 V_4 \cos(\varphi_{34})}{L_2}\right)y + \frac{V_1^2 + V_3^2}{2}$$

Followings are set:

$$m_1 = \frac{V_1^2}{2L_1^2} + \frac{V_2^2}{2L_1^2} - \frac{V_1 V_2 \cos(\varphi_{12})}{L_1^2}, \qquad (1\text{-}20)$$
$$n_1 = -\frac{V_1^2}{L_1} + \frac{V_1 V_2 \cos(\varphi_{12})}{L_1}$$

$$m_2 = \frac{V_3^2}{2L_2^2} + \frac{V_4^2}{2L_2^2} - \frac{V_3 V_4 \cos(\varphi_{34})}{L_2^2}, \qquad (1\text{-}21)$$
$$n_2 = -\frac{V_3^2}{L_2} + \frac{V_3 V_4 \cos(\varphi_{34})}{L_2}$$

Then the formula (1-19) becomes:

$$V_{rms}^2 = m_1 x^2 + n_1 x + m_2 y^2 + n_2 y + \frac{V_1^2 V_3^2}{2} \qquad (1\text{-}22)$$

Two cases are taken into consideration according to the above formula:

Firstly, when $\varphi_{12} = \varphi_{34} = 2N\pi$, $N=0, \pm 1, \pm 2, \pm 3 \ldots$ and $V_1 = V_2$, $V_3 = V_4$, then $$V_{rms}^2 = \frac{V_1^2 + V_3^2}{2},$$

at this time, the voltage is independent from the coordinate and the voltage at any point in the coordinate system remains unchanged, and the optical device (the lens) of example 2 is a variable phase retarder.

Secondly, when an $\varphi_{12} \neq 2N\pi$, and $\varphi_{34} \neq 2N\pi$, $N=0, \pm 1, \pm 2, \pm 3, \ldots$, $=m_1=m_2\neq 0$, the formula (1-22) becomes:

$$V_{rms}^2 = m_1\left(x^2 + \frac{n_1}{m_1}x\right) + m_2\left(y^2 + \frac{n_2}{m_2}y\right) + \frac{V_1^2 + V_3^2}{2} \qquad (1\text{-}23)$$
$$= m_1\left(x + \frac{n_1}{2m_1}\right)^2 + m_2\left(y + \frac{n_2}{2m_2}\right)^2 -$$
$$\frac{n_1^2}{4m_1} - \frac{n_2^2}{4m_2} + \frac{V_1^2 + V_3^2}{2}$$

Thus, the distribution of the equipotential lines in the liquid crystal layer is shaped as an ellipse, and a position of a center of the ellipse $$\left(-\frac{n_1}{2m_1}, -\frac{n_2}{2m_2}\right),$$

namely me position of the center of the ellipse is:

$$\left(\frac{2V_1[V_1 - V_2\cos(\varphi_{12})]}{V_1^2 + V_2^2 - 2V_1 V_2\cos(\varphi_{12})} \cdot \frac{L_1}{2}, \frac{2V_3[V_3 - V_4\cos(\varphi_{34})]}{V_3^2 + V_4^2 - 2V_3 V_4\cos(\varphi_{34})} \cdot \frac{L_2}{2}\right) \qquad (1\text{-}24)$$

The position of the center of the equipotential lines is a lens center of the optical device.

Example 3

In example 3, the optical device (physical optical lens) prepared according to the structure of the optical device of example 2 is tested. The structure of the optical device is shown from FIG. 18 to FIG. 20, and parameters of the structure of the optical device are shown in Table 1 wherein a light transmission area of the optical device is 5 mm*5 mm, a distance from an electrode V1 to an electrode V2 and a distance from an electrode V3 to an electrode V4 are both 5 mm, a thickness of the liquid crystal layer is 80 μm, and a birefringence Δn of the liquid crystal material is 0.259.

TABLE 1

| Parameters | Values | Illustration |
|---|---|---|
| D | 5 mm*5 mm | Light transmission area |
| d | 80 μm | Thickness of liquid crystal layer |
| $R_{HR}$ | $10^6 \Omega/\square$ | Surface impedance of impedance membrane |
| $\varepsilon_{//}$ | 10.6 | Dielectric constant along a direction parallel with a long axis direction of liquid crystal molecule |
| $\varepsilon_\perp$ | 3.7 | Dielectric constant along a direction perpendicular to a long axis direction of liquid crystal molecule |
| Δn | 0.295 | Birefringence of liquid crystal material |
| $n_o$ | 1.525 | Refractive index of light o of liquid crystal |
| $n_e$ | 1.820 | Refractive index of light e of liquid crystal |

Example 4

Figure 22:
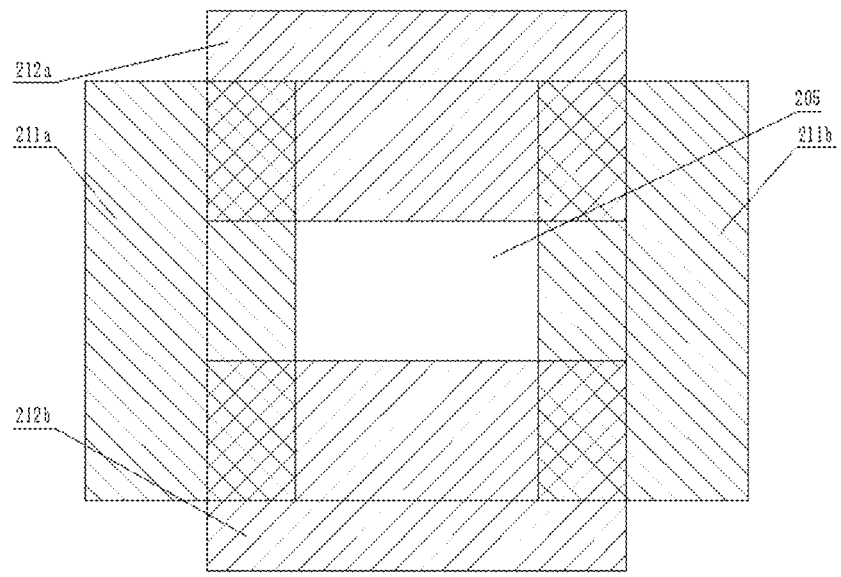
FIG. 22 is a projection view of each electrode of the optical device along a light transmission direction of example 4.

As shown in FIG. 22, an optical device of example 4 is obtained by improving the structure of the optical device of example 2, in detail, the first electrode, the second electrode, the third electrode, and the fourth electrode of the optical device of example 4 form a rectangle along the light transmission direction. That is, the distance $L_1$ between the first electrode and the second electrode is greater than the distance $L_2$ between the third electrode and the fourth electrode.

The principles of other parts of the optical device of example 4 are similar to those of the optical device of example 2.

Second Embodiment

Figure 23:
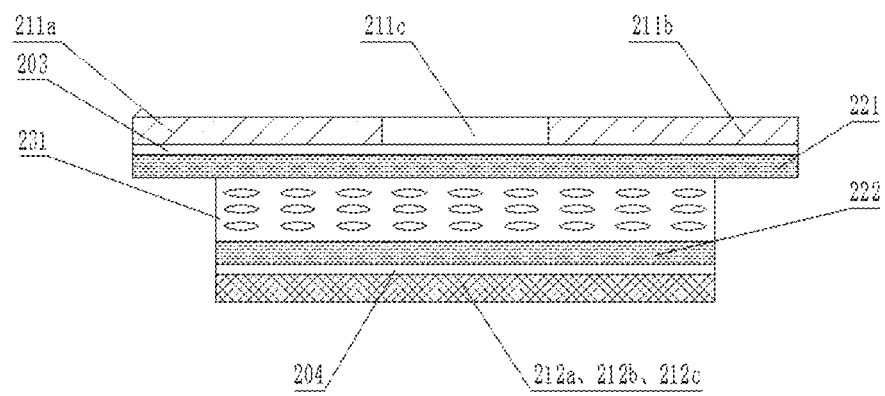
FIG. 23 is a schematic view of an optical device in accordance with a second embodiment of the present invention.

As shown in FIG. 23, an optical device of a second embodiment is obtained by improving the structure of the optical device of the first embodiment. In detail, the first substrate and the second substrate are omitted; the optical device of the second embodiment further includes a protection layer arranged between the first impedance membrane and the first alignment layer and a second protection layer arranged between the second impedance membrane and the second alignment layer. Thicknesses of the first protection layer and the second protection layer are both 1 micron. An insulating layer is used for protecting the impedance membranes and the electrodes, and at the same time making surfaces of the electrodes, the impedance membranes and the alignment layers flat.

The principles of other parts of the optical device of the second embodiment are similar to those of the optical device of the first embodiment.

Third Embodiment

Figure 24:
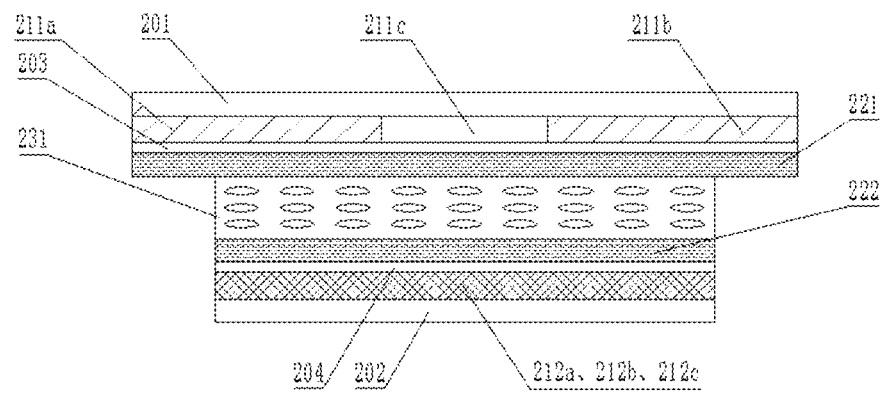
FIG. 24 is a schematic view of an optical device in accordance with a third embodiment of the present invention.

As shown in FIG. 24, an optical device of a third embodiment is obtained by improving the structure of the optical device of the first embodiment. In detail, the optical device of the third embodiment further includes a protection layer arranged between the first impedance membrane and the first alignment layer and a second protection layer arranged between the second impedance membrane and the second alignment layer. The first protection layer and the second protection layer are capable of protecting the liquid crystal layer in the optical device (optical lens). With the configuration, based on the optical device of example 2, the optical device of the third embodiment is capable of protecting the liquid crystal layer in the optical device.

The principles of other parts of the optical device of the third embodiment are similar to those of the optical device of the first embodiment.

Fourth Embodiment

An imaging device is provided in a fourth embodiment of the present invention. The imaging device includes the optical device of any above embodiment.

Fifth Embodiment

A focus driving method of an optical device of any above embodiment is provided in a fifth embodiment of the present invention. The focus driving method includes steps as follows.

In step S1, applying alternating voltages to the first electrode, the second electrode, the third electrode, and the fourth electrode respectively, wherein amplitudes of the alternating voltages applied to the first electrode, the second electrode, the third electrode, the fourth electrode are respectively $V_1$, $V_2$, $V_3$ and $V_4$, and the liquid crystal layer is in a first lens state.

In step S2, changing the amplitudes of the alternating voltages applied to the first electrode, the second electrode, the third electrode, and the fourth electrode to be respectively $nV_1$, $nV_2$, $nV_3$ and $nV_4$, such that the liquid crystal layer is in a second lens state, wherein n is a positive number.

Example 5

Figure 25:
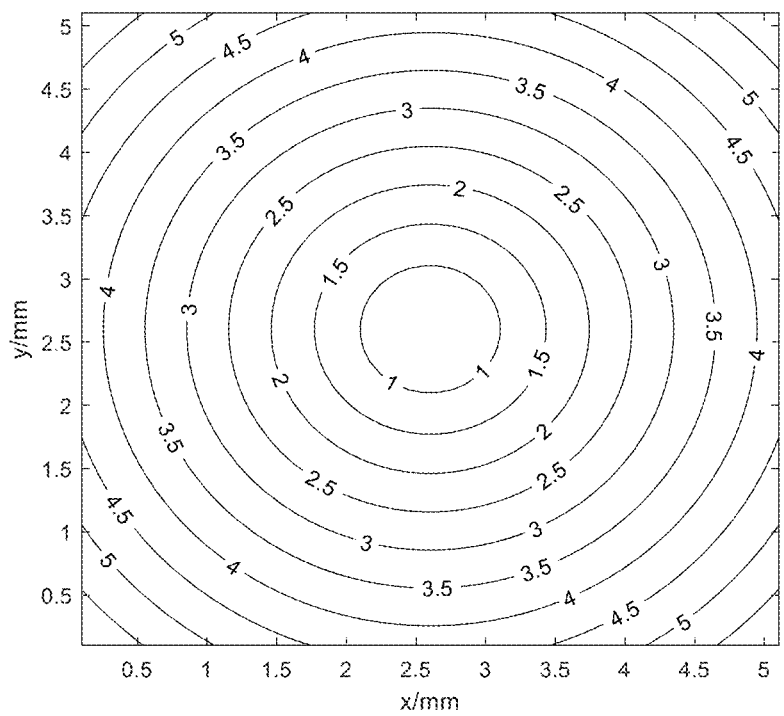
FIG. 25 is a simulated view showing a distribution of equipotential lines in a liquid crystal layer of an optical device of example 5.

In example 5, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=170°$, $V_1=V_2=V_3=V_4=6V$. According to the formula (1-23), it can be concluded that the distribution of the equipotential lines in the liquid crystal layer is shaped as a circle and a position of a center of the circle is (5/2 mm, 5/2 mm). The distribution of the equipotential lines of the liquid crystal layer is as shown in FIG. 25 by simulating the liquid crystal layer through the formula (1-8).

Example 6

Figure 26:
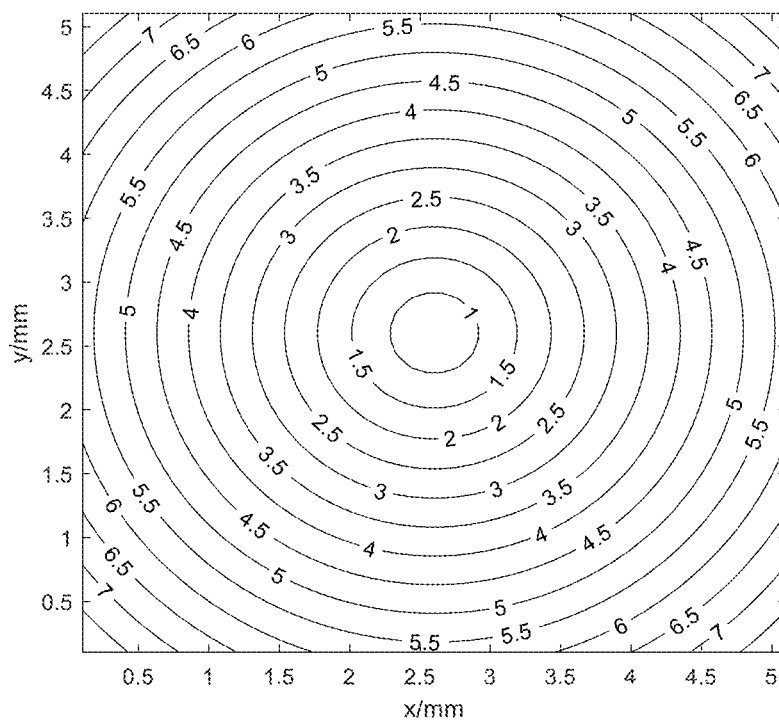
FIG. 26 is a simulated view showing a distribution of equipotential lines in a liquid crystal layer of an optical device of example 6.

In example 6, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=170°$, $V_1=V_2=V_3=V_4=8V$. According to the formula (1-23), it can be concluded that the distribution of the equipotential lines in the liquid crystal layer is shaped as a circle and a position of a center of the circle is (5/2 mm, 5/2 mm). The distribution of the equipotential lines of the liquid crystal layer is as shown in FIG. 26 by simulating the liquid crystal layer through the formula (1-8).

The refractive index of the liquid crystal layer changes with an effective voltage of the liquid crystal layer. From FIG. 25, FIG. 26, and the formula (1-23), it can be concluded that, on the basis that the amplitudes of the voltages are equal to each other, a distance between two adjacent equipotential lines is decreased (that is the equipotential lies are more and more intense) and thus an optical power of the optical device (optical lens) is changed by increasing the amplitudes of the voltages in the same proportion, thus, a focal distance of the optical device is electrically adjusted. Similarly, on the basis that the amplitudes of the voltages are equal to each other, the distanced between two adjacent equipotential lines can be increased (that is the equipotential lies are sparser and sparser) by decreasing the amplitudes of the voltages in the same proportion, thus, the optical power of the optical device is electrically adjusted.

Sixth Embodiment

A focus driving method of an optical device of any above embodiment is provided in a sixth embodiment of the present invention. The focus driving method includes steps as follows.

In step S1, applying alternating voltages to the first electrode, the second electrode, the third electrode, and the fourth electrode respectively, wherein initial phases of the alternating voltages applied to the first electrode, the second electrode, the third electrode, the fourth electrode are respectively $\varphi_1$, $\varphi_2$, $\varphi_3$, and $\varphi_4$, $\varphi_1=\varphi_3=0$, $\varphi_2=\varphi_4$, and the liquid crystal layer is in a first lens state.

In step S2, changing the initial phases of the alternating voltages applied to the first electrode, the second electrode, the third electrode, and the fourth electrode to be respectively $\varphi_5$ such that the liquid crystal layer is in a second lens state.

Example 7

Figure 27:
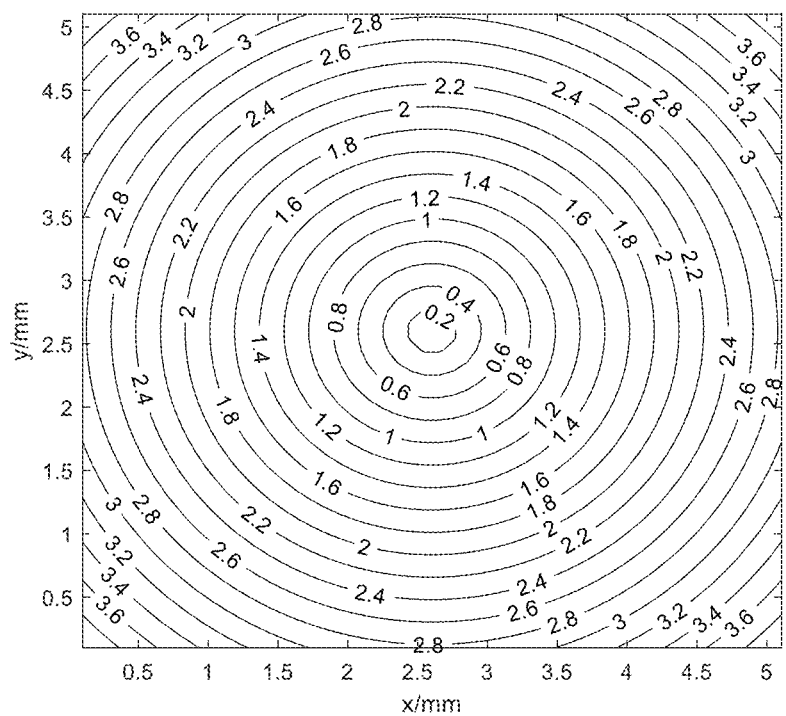
FIG. 27 is a simulated view showing a distribution of equipotential lines in a liquid crystal layer of an optical device of example 7.

In example 7, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=180°$, $V_1=V_2=V_3=V_4=4V$. According to the formula (1-23), it can be concluded that the distribution of the equipotential lines in the liquid crystal layer is shaped as a circle and a position of a center of the circle is (5/2 mm, 5/2 mm). The distribution of the equipotential lines of the liquid crystal layer is as shown in FIG. 27 by simulating the liquid crystal layer through the formula (1-8).

Example 8

Figure 28:
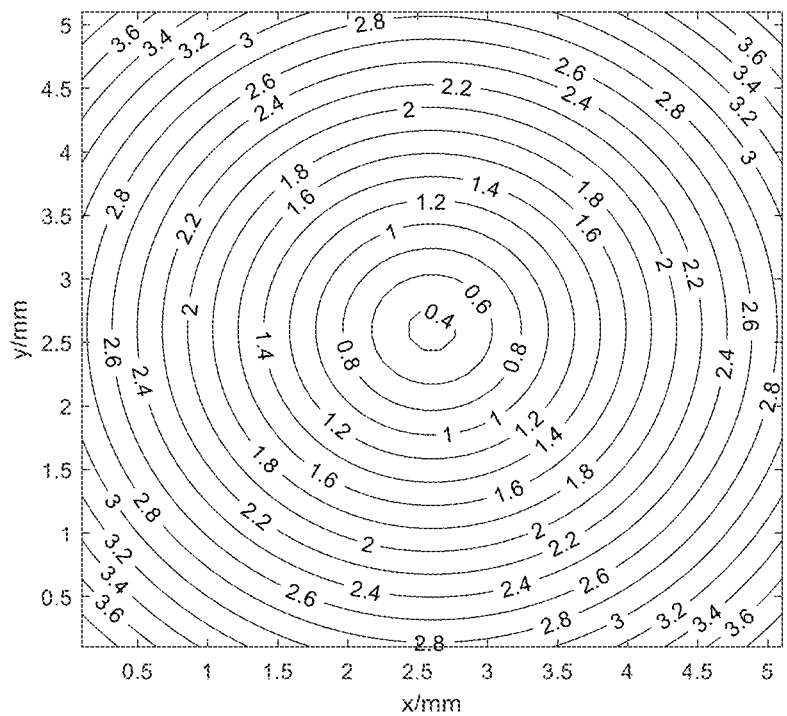
FIG. 28 is a simulated view showing a distribution of equipotential lines in a liquid crystal layer of an optical device of example 8.

In example 8, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=170°$, $V_1=V_2=V_3=V_4=4V$. According to the formula (1-23), it can be concluded that the distribution of the equipotential lines in the liquid crystal layer is shaped as a circle and a position of a center of the circle is (5/2 mm, 5/2 mm). The distribution of the equipotential lines of the liquid crystal layer is as shown in FIG. 28 by simulating the liquid crystal layer through the formula (1-8).

Example 9

Figure 29:
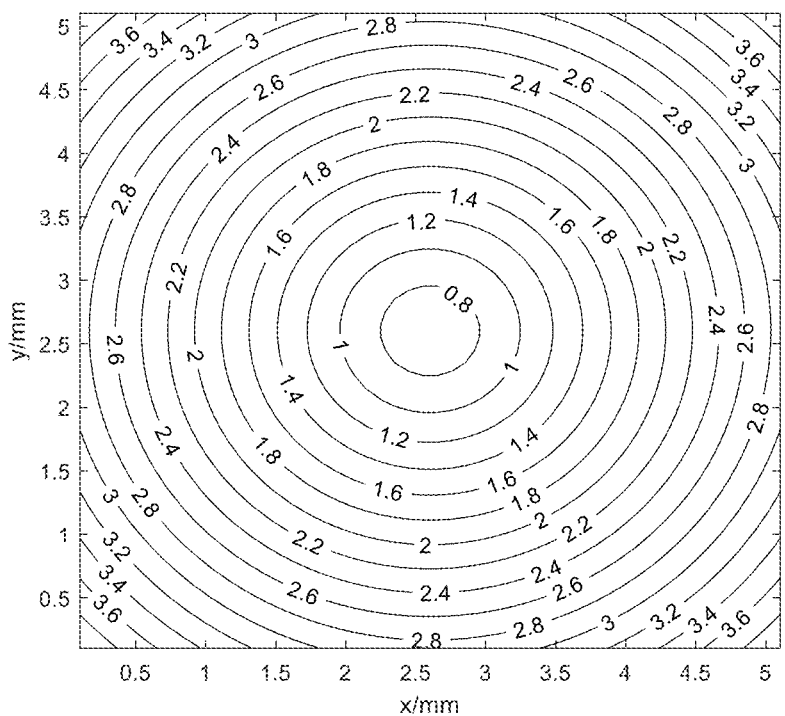
FIG. 29 is a simulated view showing a distribution of equipotential lines in a liquid crystal layer of an optical device of example 9.

In example 9, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=160°$, $V_1=V_2=V_3=V_4=4V$. According to the formula (1-23), it can be concluded that the distribution of the equipotential lines in the liquid crystal layer is shaped as a circle and a position of a center of the circle is (5/2 mm, 5/2 mm). The distribution of the equipotential lines of the liquid crystal layer is as shown in FIG. 29 by simulating the liquid crystal layer through the formula (1-8).

Example 10

Figure 30:
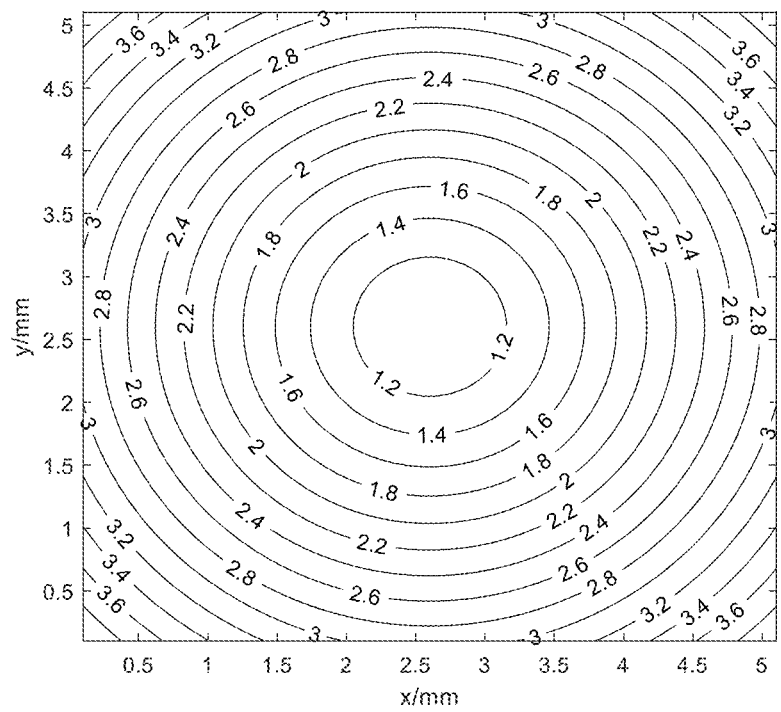
FIG. 30 is a simulated view showing an arrangement of equipotential lines in a liquid crystal layer of an optical device of example 10.

In example 10, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=150°$, $V_1=V_2=V_3=V_4=4V$. According to the formula (1-23), it can be concluded that the distribution of the equipotential lines in the liquid crystal layer is shaped as a circle and a position of a center of the circle is (5/2 mm, 5/2 mm). The distribution of the equipotential lines of the liquid crystal layer is as shown in FIG. 30 by simulating the liquid crystal layer through the formula (1-8).

The refractive index of the liquid crystal layer changes with an effective voltage of the liquid crystal layer. From FIG. 27 to FIG. 30 and the formula (1-23), it can be concluded that, on the basis that initial phase angles of the voltages applied to the first electrode and the third electrode are both 0 degrees and initial phase angles of the voltages applied to the second electrode and the fourth electrode are equal to each other, the distance between two adjacent equipotential lines is increased (that is, the equipotential lines are more and more intense) by decreasing the initial phase angles of the voltages applied to the second electrode and the fourth electrode, thereby changing an intensity of an electric field and further changing the optical power of the optical device. Similarly, the distance between two adjacent equipotential lines is decreased (that is, the equipotential lines are sparser and sparser) by increasing the initial phase angles of the voltages applied to the second electrode and the fourth electrode, thereby changing the optical power of the optical device and electrically adjusting the focal distance of the optical device.

Figure 31:
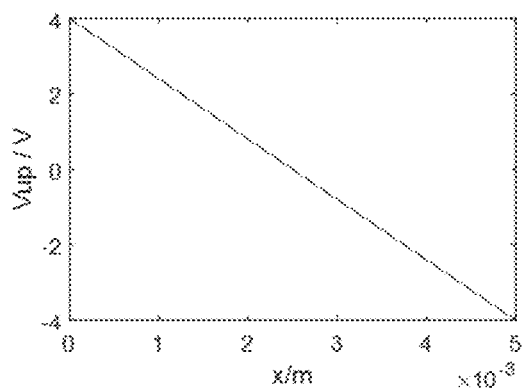
FIG. 31 is a schematic view showing a distribution of potential lines from a first electrode to a second electrode when $V_1=V_2=V_3=V_4=4V$, $f_1=f_2=1$ kHz, $f_3=f_4=2$ kHz, $\phi_1=\phi_4=0°$, $\phi_2=\phi_3=180°$.
Figure 32:
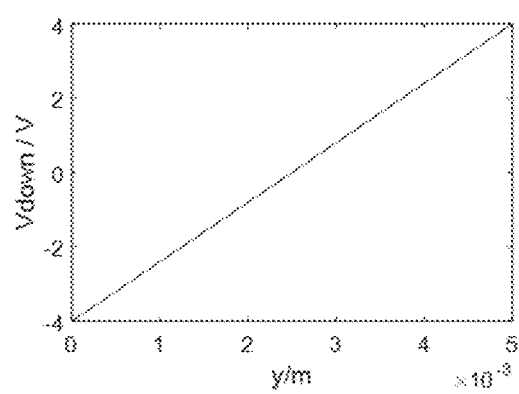
FIG. 32 is a schematic view showing a distribution of potential lines from a third electrode to a fourth electrode when $V_1=V_2=V_3=V_4=4V$, $f_1=f_2=1$ kHz, $f_3=f_4=2$ kHz, $\phi_1=\phi_4=0°$, $\phi_2=\phi_3=180°$.

When $V_1=V_2=V_3=V_4=4V$, $f_1=f_2=1$ kHz, $f_3=f_4=2$ kHz, $\phi_1=\phi_4=0°$, $\phi_2=\phi_3=180°$, a potential distribution from the first electrode to the second electrode is as shown in FIG. 31 and a potential distribution from the third electrode to the fourth electrode is as shown in FIG. 32.

Example 11

Figure 33:
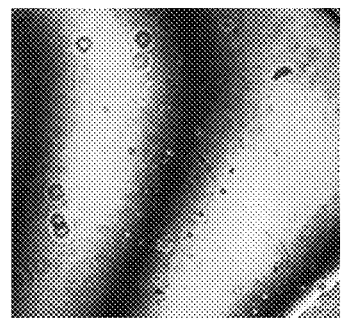
FIG. 33 is an interference fringe pattern obtained from an optical device of example 11.

In example 11, a test is performed based on the physical optical device of example 3. When no voltages are applied to the electrodes, an interference fringe pattern obtained from the optical device with green laser having a wavelength of 532 nm is as shown in FIG. 33.

Example 12

Figure 34:
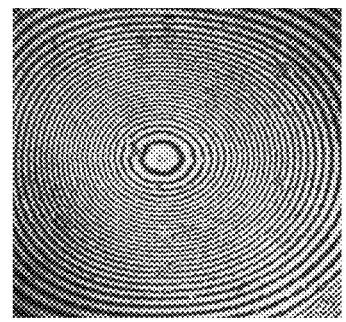
FIG. 34 is an interference fringe pattern obtained from an optical device of example 12.

In example 12, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are: $V_1=V_2=V_3=V_4=4V$, $f_1=f_2=1$ kHz, $f_3=f_4=2$ kHz, $\phi_1=\phi_3=0°$, $\phi_2=\phi_4$ 170°. At this time, an interference fringe pattern obtained from the optical device with a green laser having a wavelength of 532 nm is as shown in FIG. 34.

Example 13

In example 13, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are: $V_1=V_2=V_3=V_4=4V$, $f_1=f_2=1$ kHz, $f_3=f_4=2$ kHz, $\phi_1=\phi_3=0°$, $\phi_2=\phi_4$ 160°. At this time, an interference fringe pattern obtained from the optical device with a green laser having a wavelength of 532 nm as shown in FIG. 35.

Example 14

In example 14, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are: $V_1=V_2=V_3=V_4=4V$, $f_1=f_2=1$ kHz, $f_3=f_4=2$ kHz, $\phi_1=\phi_3=0°$, $\phi_2=\phi_4=150°$. At this time, an interference fringe pattern obtained from the optical device with a green laser having a wavelength of 532 nm is as shown in FIG. 36.

Figure 35:
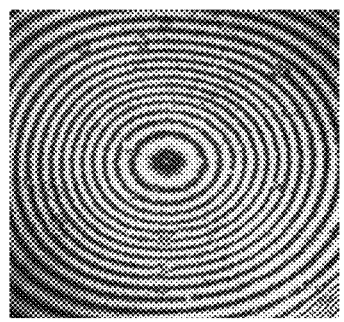
FIG. 35 is an interference fringe pattern obtained from an optical device of example 13.
Figure 36:
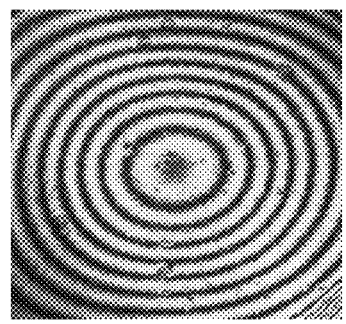
FIG. 36 is an interference fringe pattern obtained from an optical device of example 14.

By comparing FIG. 28 with FIG. 34, FIG. 29 with FIG. 35, and FIG. 30 with FIG. 36, it can be concluded that the result of the test is substantially in consistent with the result of the simulation. It can be seen from the interference fringe pattern that the optical device produces three strips of interference fringes and the interference fringes are slightly bent due to an uneven thickness of the liquid crystal layer, which however does not affect the test. The interference fringes in FIG. 34 to FIG. 36 are close to circles, and the number of rings of the interference fringes changes with the phase of the driving voltage.

Referring to FIG. 27, FIG. 28, FIG. 29, FIG. 30, FIG. 34, FIG. 35, and FIG. 36, it can be seen that the optical device in example 7, example 8, example 9, example 12, example 13, and example 14 of the present invention is the round lens, and distribution of the equipotential lines in the liquid crystal layer of the round lens is shaped as a circle.

Example 15

Figure 37:
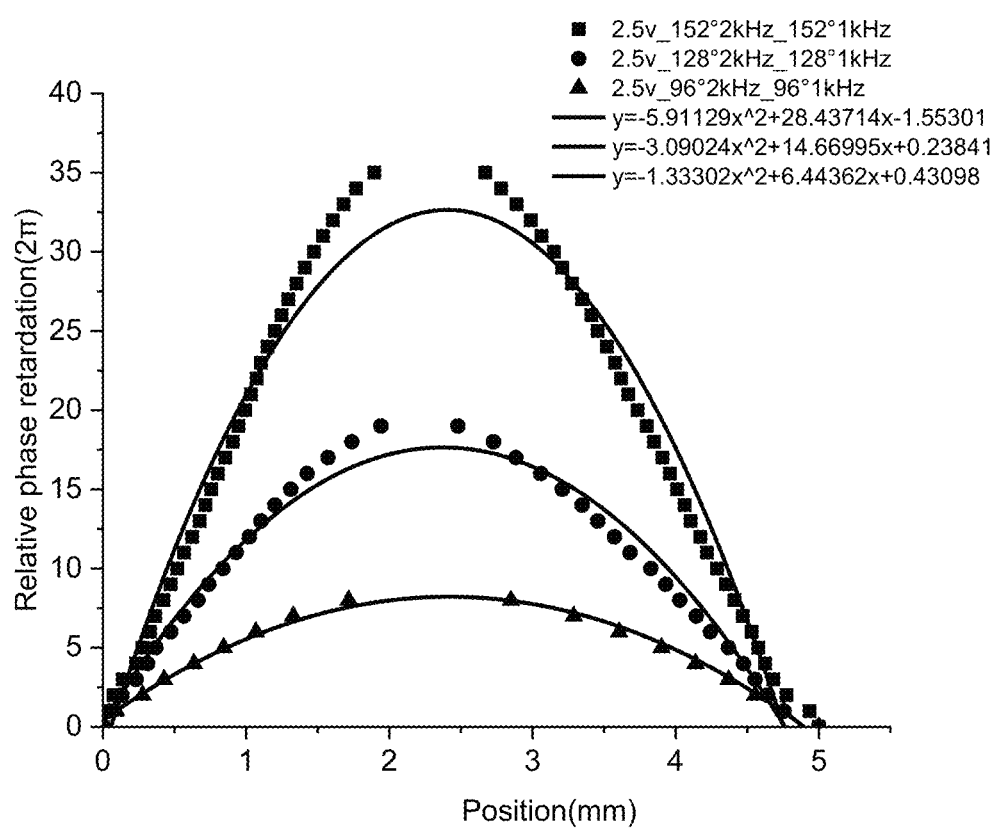
FIG. 37 is a schematic view showing a relationship between a phase shift and a x coordinate of example 15.

In example 15, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are: $V_1=V_2=V_3=V_4=2.5V$, $f_1=f_2=1$ kHz, $f_3=f_4=2$ kHz, $\varphi_1=\varphi_3=0°$, $\varphi_2=\varphi_4=\varphi$. When $\varphi$ is respectively 96°, 128°, and 152°, the test result of a relationship between a phase shift $\psi$ of the physical optical device measured in diameter range within 5 mm and a coordinate x is respectively as shown in FIG. 37. When $\varphi=96°$, a secondary curve is used to fit the measurement values of the test to obtain a fitting curve $\psi=-1.33302 x^2+6.44362 x+0.43098$; when $\varphi=128°$, the obtained fitting curve is $\psi=-3.09024 x^2+14.66995 x+0.23841$; when $\varphi=152°$, the obtained fitting curve is $\psi=-5.91129 x^2+28.43714 x-1.55301$.

The test result shows that a testing value of a position of a center of the phase shift moves sidewards due to the uneven thickness of the liquid crystal layer, and the test results are in consistent with the simulation results of examples 7 to 10 in which the focal distance of the optical device is electrically adjusted by adjusting the phase of the voltage applied to each electrode.

Figure 38:
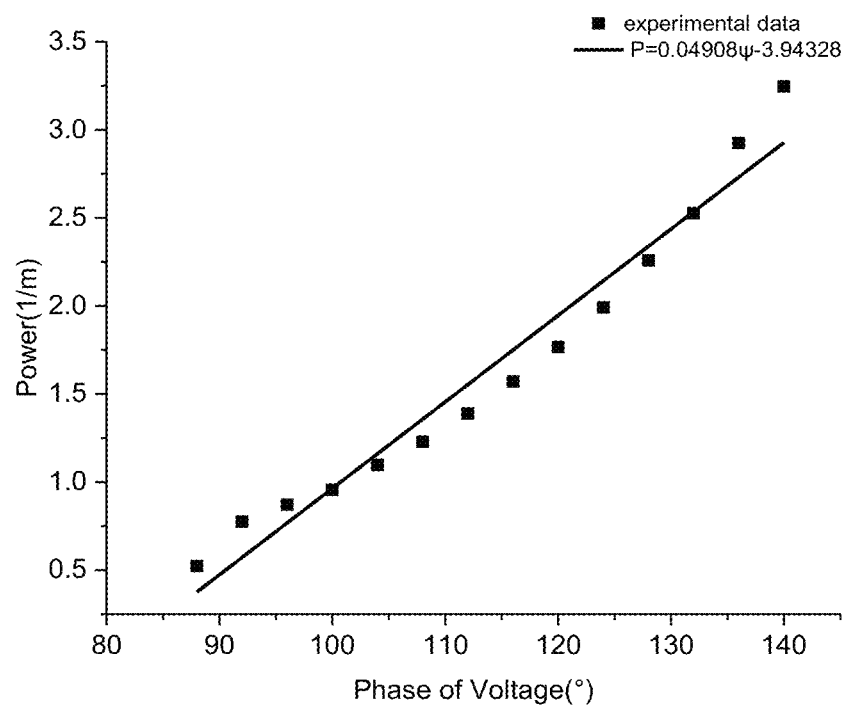
FIG. 38 is a schematic view showing a relationship between an optical power and initial phase angles of voltages from a second electrode and a fourth electrode.

Meanwhile, FIG. 38 is a schematic view showing the relationship between the optical power of the optical device and the phase $\varphi$ of the driving voltage. A linear function is used to fit the actual data. From FIG. 38, it can be concluded that the optical device changes from 0.52 (1/m) to 3.2 (1/m) as the phase $\varphi$ of the driving voltage increase when the phase of the voltage is in a range from 88° to 140°. A secondary curve is used to fit the measuring value of the test to obtain a fitting curve $P=0.04908 \varphi-3.94328$, which shows that the optical power substantially changes linearly as the phase of the voltage changes. The result also shows that the focal distance of the optical device of the present invention can be electrically adjusted.

Seventh Embodiment

A method for moving a lens center of an optical device of any above embodiment is provided in the seventh embodiment. The method includes steps as follows.

In step S1, applying alternating voltages to the first electrode, the second electrode, the third electrode, and the fourth electrode respectively, wherein the lens center of the optical device is in a first position.

In step S2, changing amplitudes of the voltages applied to the first electrode and/or the third electrode, wherein the lens center of the optical device is in a second position.

Example 16

Figure 39:
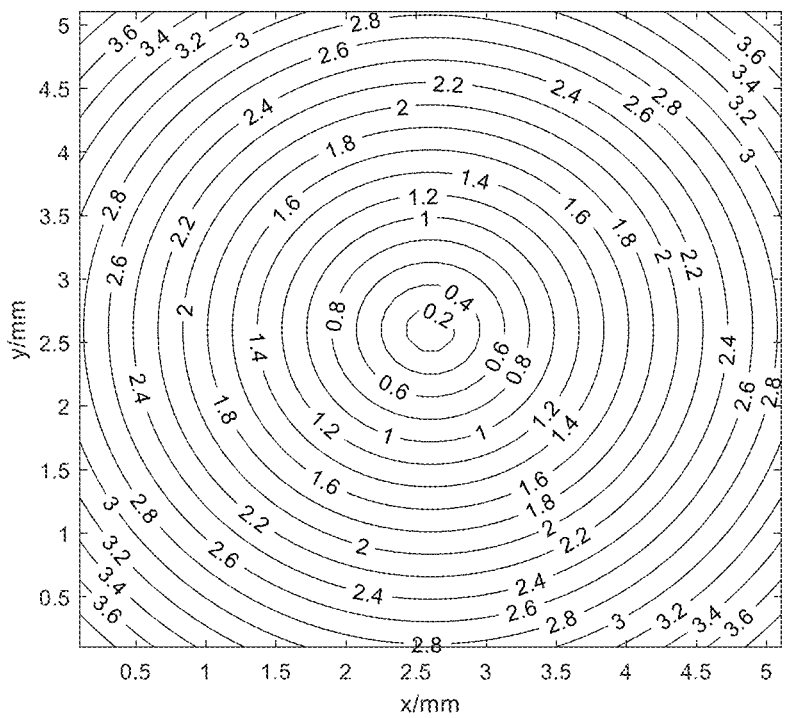
FIG. 39 is a schematic view showing a distribution of equipotential lines in a liquid crystal layer of an optical device of example 16.

In example 16, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=180°$, $V_1=V_2=V_3=V_4=4V$. According to the formula (1-23), it can be concluded that the distribution of the equipotential lines in the liquid crystal layer is shaped as a circle and a position of a center of the circle (the center of the circle is the lens center) is (5/2 mm, 5/2 mm). The distribution of the equipotential lines in the liquid crystal layer is as shown in FIG. 39 by simulating the liquid crystal layer through the formula (1-8).

Example 17

Figure 40:
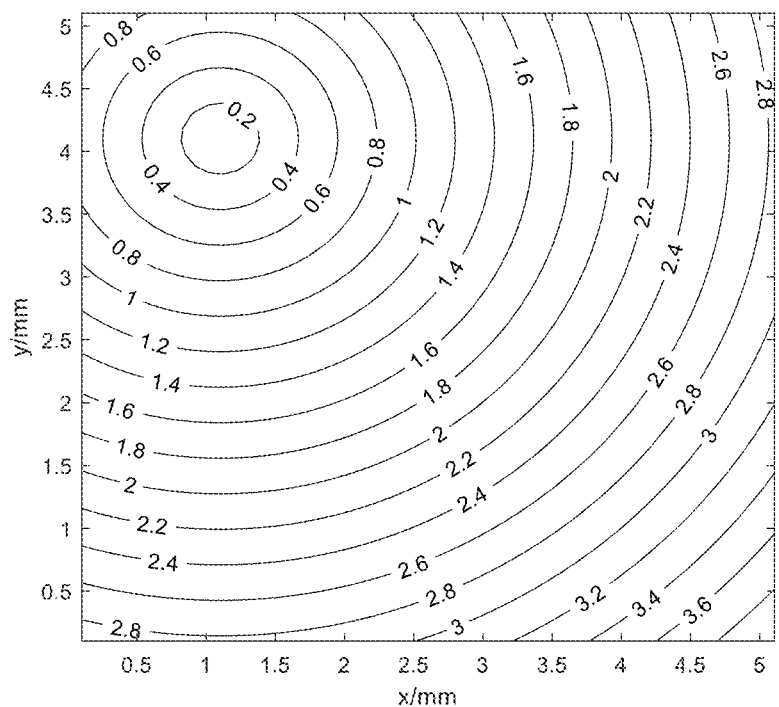
FIG. 40 is a schematic view showing a distribution of equipotential lines in a liquid crystal layer of an optical device of example 17.

In example 17, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=180°$, $V_1=V_4=1V$, $V_2=V_3=4V$. According to the formula (1-23), it can be concluded that the distribution of the equipotential lines in the liquid crystal layer is shaped as a circle and a position of a center of the circle is (1 mm, 4 mm). The distribution of the equipotential lines in the liquid crystal layer is as shown in FIG. 40 by simulating the liquid crystal layer through the formula (1-8).

Example 18

Figure 41:
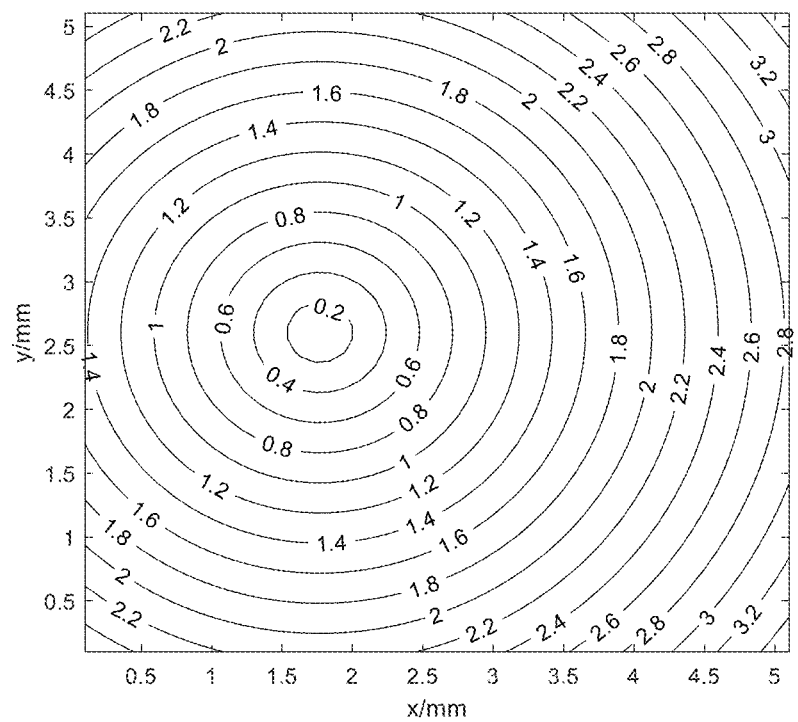
FIG. 41 is a schematic view showing a distribution of equipotential lines in a liquid crystal layer of an optical device of example 18.

In example 18, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=0°$, $\varphi_2=\varphi_4=180°$, $V_1=V_4=1V$, $V_2=V_3=4V$. According to the formula (1-23), it can be concluded that the distribution of the equipotential lines in the liquid crystal layer is shaped as a circle and a position of a center of the circle is (5/3 mm, 5/2 mm). The distribution of the equipotential lines in the liquid crystal layer is as shown in FIG. 41 by simulating the liquid crystal layer through the formula (1-8).

Example 19

Figure 42:
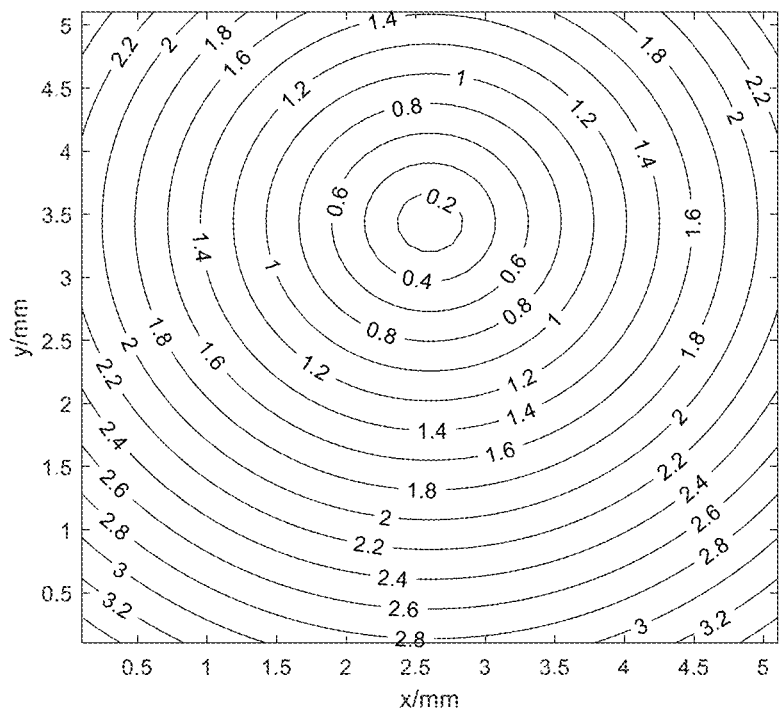
FIG. 42 is a schematic view showing a distribution of equipotential lines in a liquid crystal layer of an optical device of example 19.

In example 19, a simulation is performed based on the optical device of example 2. Voltages in formulas (1-1), (1-2), (1-3), and (1-4) are respectively applied to the first electrode, the second electrode, the third electrode, and the fourth electrode of the example 2. Parameters of the voltages are respectively $f_1=f_2=1$ kHz, $f_3=f_4=2$ kHz, $\varphi_1=\varphi_3=0°$, $\varphi_2=\varphi_4$ 180°, $V_1=V_2=3V$, $V_3=4V$, $V_4=2V$. According to the formula (1-23), it can be concluded that the distribution of the equipotential lines in the liquid crystal layer is shaped as a circle and a position of a center of the circle is (5/2 mm, 10/3 mm). The distribution of the equipotential lines in the liquid crystal layer is as shown in FIG. 42 by simulating the liquid crystal layer through the formula (1-8).

From FIG. 39 to FIG. 42 and the formula (1-23), it can be concluded that the position of the center of the equipotential lines (the position of the lens center of the optical device) can be controlled by adjusting the amplitude of each voltage on the basis that a phase difference between the voltages applied on the same substrate is a fixed value (that is, the frequency and the phase of each voltage are fixed).

Examples 16 to 19 shows that the method for moving the lens center of the optical device of the seventh embodiment can be realized, thus, the method for moving the lens center of the optical device of the seventh embodiment is applicable in optical tweezers. In 1986, Arthur Ashkin, according to the mechanical effect, captured microparticles through a gradient force three-dimensional optical potential well produced by a single beam of strong focusing laser, marking the invention of the optical tweezers technology. The technology can manipulate living substances without contact and damage, thereby becoming one of the important researching tools in the biological field. Meanwhile, the optical tweezers technology can realize the manipulation of the microparticles and the measurement of microforces, thus, the optical tweezers technology is widely applied in the physical or chemical field.

The method for moving the lens center of the optical device of the seventh embodiment can be applied in the optical tweezers technology. In detail, the light (laser) is controlled to pass through the center of the optical device to capture microparticles; by the method of the seventh embodiment, the lens center of the optical device is changed and thus the light (laser) is controlled to move with the lens center, thereby moving the captured microparticles.

Eighth Embodiment

An optical device is provided in the eighth embodiment, including a first electrode layer, a first alignment layer, a liquid crystal layer, a second alignment layer, and a second electrode layer arranged in turn along a light transmission direction. The first electrode layer includes a first electrode, a second electrode, and a first impedance membrane arranged between the first electrode and the second electrode. The first electrode and the second electrode are respectively arranged at opposite ends of the first impedance membrane. The second electrode layer includes a third electrode, a fourth electrode, and a second impedance membrane arranged between the third electrode and the fourth electrode. The third electrode and the fourth electrode are respectively arranged at opposite ends of the second impedance membrane. The first electrode, the second electrode, the third electrode, and the fourth electrode form a parallelogram light transmission hole along the light transmission direction, and alternating voltages obtained from the first electrode, the second electrode, the third electrode, and the fourth electrode satisfy the following formulas.

$$\frac{V_1^2}{2L_1^2} + \frac{V_2^2}{2L_1^2} - \frac{V_1 V_2 \cos(\varphi_1 - \varphi_2)}{L_1^2} \neq 0$$

$$\frac{V_3^2}{2L_2^2} + \frac{V_4^2}{2L_2^2} - \frac{V_3 V_4 \cos(\varphi_3 - \varphi_4)}{L_2^2} \neq 0$$

$$\frac{V_1^2}{2L_1^2} + \frac{V_2^2}{2L_1^2} - \frac{V_1 V_2 \cos(\varphi_1 - \varphi_2)}{L_1^2} \neq \frac{V_3^2}{2L_2^2} + \frac{V_4^2}{2L_2^2} - \frac{V_3 V_4 \cos(\varphi_3 - \varphi_4)}{L_2^2}$$

Wherein $L_1$ is a distance between the first electrode and the second electrode, $L_2$ is a distance between the third electrode and the fourth electrode, $V_1$ and $\varphi_1$ are respectively an amplitude and an initial phase of the alternating voltage obtained from the first electrode, $V_2$ and $\varphi_2$ are respectively an amplitude and an initial phase of the alternating voltage obtained from the second electrode, $V_3$ and $\varphi_3$ are respectively an amplitude and an initial phase of the alternating voltage obtained from the third electrode, and $V_4$ and $\varphi_4$ are respectively an amplitude and an initial phase of the alternating voltage obtained from the fourth electrode.

According to the formula (1-22), when $m_1 \neq m_2$ and $m_1 \neq 0$, $m_2 \neq 0$, a distribution of equipotential lines in the liquid crystal layer of the optical device is shaped as an ellipse, and a position of a center of the ellipse is $$\left(-\frac{n_1}{2m_1}, \frac{n_2}{2m_2}\right),$$

that is, the position of the center of the ellipse is:

$$\left(\frac{2V_1[V_1 - V_2\cos(\varphi_{12})]}{V_1^2 + V_2^2 - 2V_1 V_2 \cos(\varphi_{12})} \cdot \frac{L_1}{2}, \frac{2V_3[V_3 - V_4\cos(\varphi_{34})]}{V_3^2 + V_4^2 - 2V_3 V_4 \cos(\varphi_{34})} \cdot \frac{L_2}{2}\right) \quad (1-25)$$

A ratio of a semi-major axis to a semi-minor axis of the ellipse is:

$$\frac{a}{b} = \sqrt{\frac{1/m_1}{1/m_2}} = \sqrt{\frac{\frac{V_3^2}{2L_2^2} + \frac{V_4^2}{2L_2^2} - \frac{V_3 V_4 \cos(\varphi_{34})}{L_2^2}}{\frac{V_1^2}{2L_1^2} + \frac{V_2^2}{2L_1^2} - \frac{V_1 V_2 \cos(\varphi_{12})}{L_1^2}}} \quad (1-26)$$

Wherein a is a length of the semiaxis long the x axis and b is a length of the semiaxis along the y axis.

According to the formula (1-26), the elliptical distribution of the equipotential lines in the liquid crystal layer of the optical device can be changed to have different ellipticities by changing the amplitude and the phase of the driving voltage.

Example 20

Figure 43:
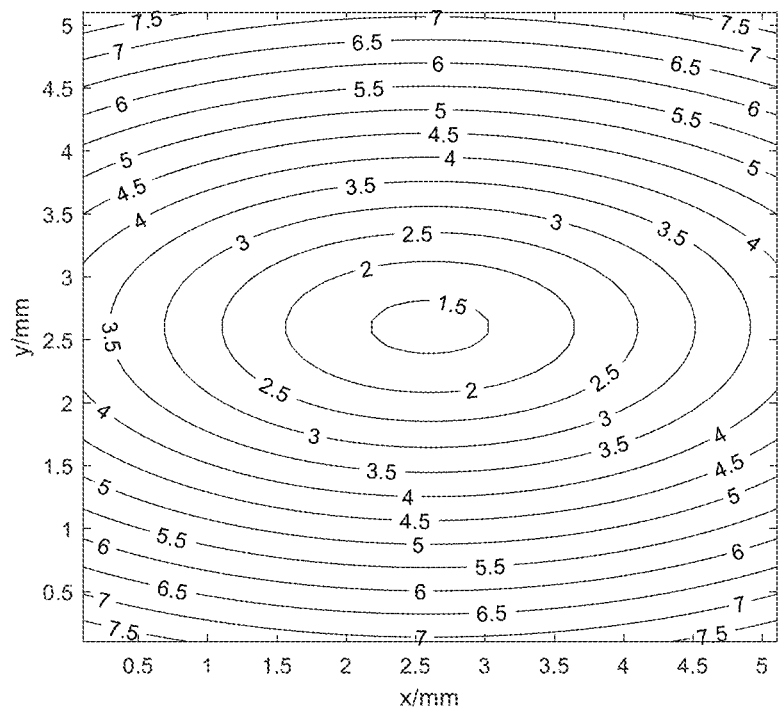
FIG. 43 is a schematic view showing a distribution of equipotential lines in a liquid crystal layer of an optical device of example 20.

In example 20, a simulation is performed based on the optical device of example 2. Alternating voltages in formulas (1-1), (1-2), (1-3), and (1-4) are respectively applied to the first electrode, the second electrode, the third electrode, and the fourth electrode, and parameters of the voltages are respectively $f_1=f_2=1$ kHz, $f_3=f_4=2$ kHz, $\varphi_1=\varphi_3=0°$, $\varphi_2=\varphi_4=160°$, $V_1=V_2=5V$, $V_3=V_4=10V$. According to the formula (1-22), it can be concluded that the distribution of the equipotential lines in the liquid crystal layer is shaped as an ellipse and a position of a center of the ellipse is (5/2 mm, 5/2 mm). The distribution of the equipotential lines in the liquid crystal layer is as shown in FIG. 43 by simulating the liquid crystal layer through the formula (1-8).

Example 21

Figure 44:
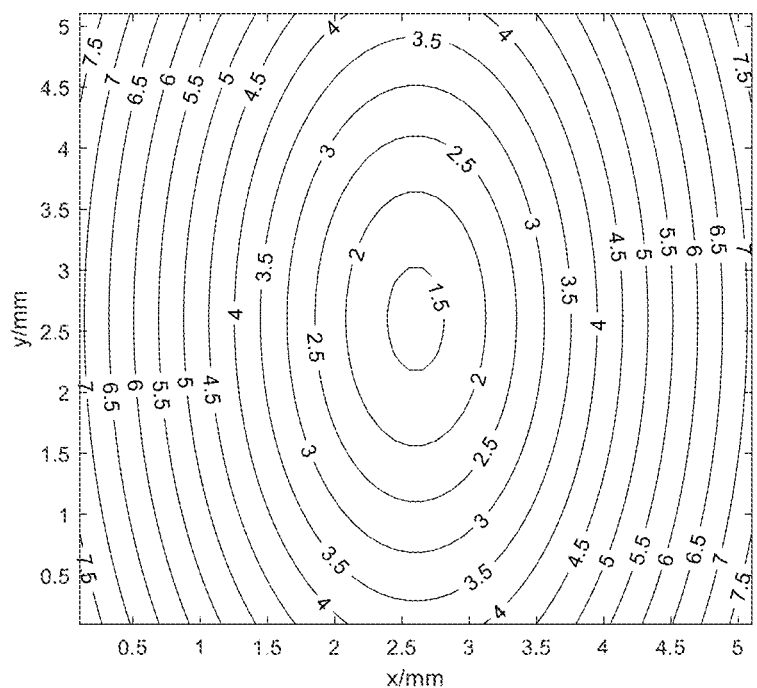
FIG. 44 is a schematic view showing a distribution of equipotential lines in a liquid crystal layer of an optical device of example 21.

In example 21, a simulation is performed based on the optical device of example 2. Alternating voltages in formulas (1-1), (1-2), (1-3), and (1-4) are respectively applied to the first electrode, the second electrode, the third electrode, and the fourth electrode, and parameters of the voltages are respectively $f_1=f_2=1$ kHz, $f_3=f_4=2$ kHz, $\varphi_1=\varphi_3=0°$, $\varphi_2=\varphi_4=160°$, $V_1=V_2=10V$, $V_3=V_4=5V$. According to the formula (1-22), it can be concluded that the distribution of the equipotential lines in the liquid crystal layer is shaped as an ellipse and a position of a center of the ellipse is (5/2 mm, 5/2 mm). According to the formula (1-26), a ratio of a semi-major axis to a semi-minor axis of the ellipse is 1/2. The distribution of the equipotential lines of the liquid crystal layer is as shown in FIG. 44 by simulating the liquid crystal layer through the formula (1-8).

Example 22

Figure 45:
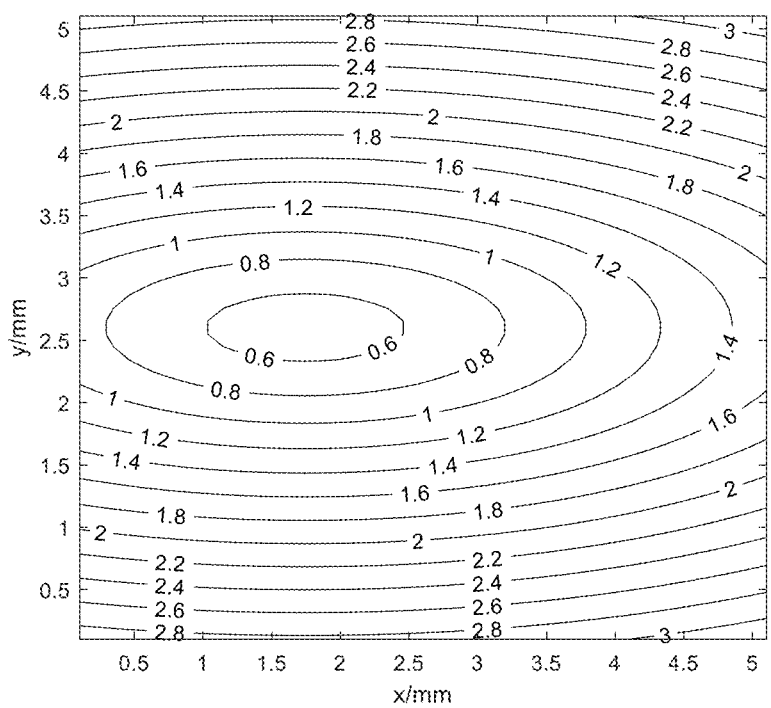
FIG. 45 is a schematic view showing a distribution of equipotential lines in a liquid crystal layer of an optical device of example 22.

In example 22, a simulation is performed based on the optical device of example 2. Alternating voltages in formulas (1-1), (1-2), (1-3), and (1-4) are respectively applied to the first electrode, the second electrode, the third electrode, and the fourth electrode, and parameters of the voltages are respectively $f_1=f_2=1$ kHz, $f_3=f_4=2$ kHz, $\varphi_1=\varphi_3=0°$, $\varphi_2=\varphi_4=160°$, $V_1=1V$, $V_2=2V$, $V_3=V_4=4V$. According to the formula (1-22), it can be concluded that the distribution of the equipotential lines in the liquid crystal layer is shaped as an ellipse and a position of a center of the ellipse is (10/3 mm, 5/2 mm). According to the formula (1-26), a ratio of a semi-major axis to a semi-minor axis of the ellipse is 8/3. The distribution of the equipotential lines in the liquid crystal layer is as shown in FIG. 45 by simulating the liquid crystal layer through the formula (1-8).

Example 23

In example 23, a simulation is performed based on the optical device of example 2. Alternating voltages in formulas (1-1), (1-2), (1-3), and (1-4) are respectively applied to the first electrode, the second electrode, the third electrode, and the fourth electrode, and parameters of the voltages are respectively $f_1=f_2=1$ kHz, $f_3=f_4=2$ kHz, $\varphi_1=\varphi_3=0°$, $\varphi_2=\varphi_4\le160°$, $V_1=V_2=4V$, $V_3=2V$, $V_4=1V$. According to the formula (1-22), it can be concluded that the distribution of the equipotential lines in the liquid crystal layer is shaped as an ellipse and a position of the ellipse is (5/2 mm, 10/3 mm). According to the formula (1-26), a ratio of a semi-major axis to a semi-minor axis of the ellipse is 3/8. The distribution of the equipotential lines in the liquid crystal layer is as shown in FIG. 46 by simulating the liquid crystal layer through the formula (1-8).

From FIG. 43 to FIG. 46 and the formula (1-26), it can be concluded that the distribution of the equipotential lines in the liquid crystal layer is shaped as an ellipse when the frequencies of the voltages applied to the same substrate are equal to each other, that is, $f_1=f_2$, $f_3=f_4$, and the frequencies of the voltages applied to different substrates are different from each other, that is, $f_1 \ne f_3$ and $m_1 \ne m_2$, $m_1 \ne 0$, $m_2 \ne 0$.

Figure 46:
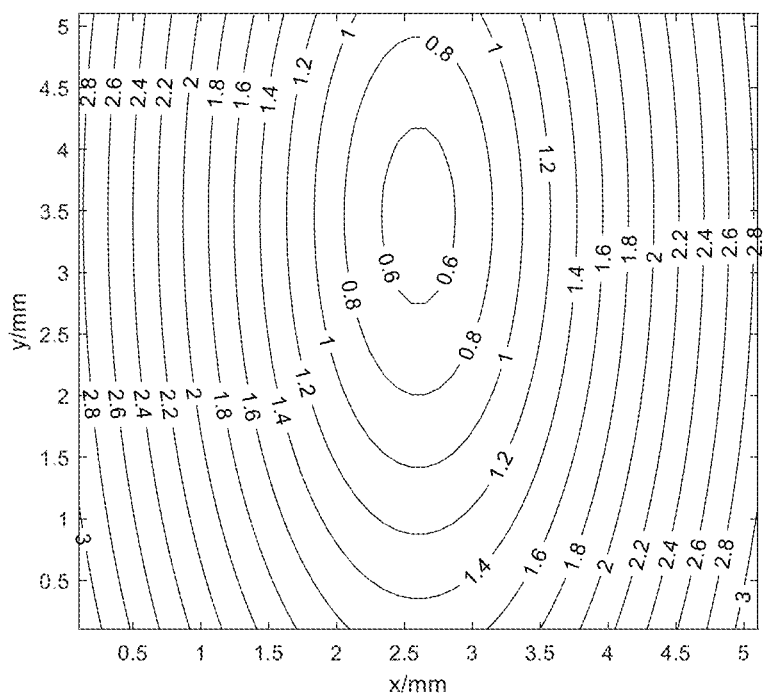
FIG. 46 is a schematic view showing a distribution of equipotential lines in a liquid crystal layer of an optical device of example 23.

By comparing FIG. 43 with FIG. 45, FIG. 44 with FIG. 46, the position of the center of the distribution of the voltage can be adjusted by adjusting the amplitude of each voltage when the phase difference of the voltages applied to the same substrate is a fixed value (that is, the phase of each voltage is fixed); meanwhile, the ratio of the semi-major axis to the semi-minor axis can be adjusted by adjusting the amplitude of each voltage.

Example 24

In example 24, a test is performed based on the physical optical device of example 3. Voltages in the formulas (1-1), (1-2), (1-3), and (1-4) are respectively applied to the first electrode, the second electrode, the third electrode, and the fourth electrode of the optical device of example 3, and parameters of the voltages are $f_1=f_2=1$ kHz, $f_3=f_4=2$ kHz, $\varphi_1=\omega_3=0°$, $\varphi_2=\varphi_4=160°$, $V_1=V_2=5V$, $V_3=V_4=10V$. At this time, an interference fringe pattern obtained from the optical device is as shown in FIG. 47, in which interference rings are ellipses and a ratio of a semi-major axis to a semi-minor axis of the ellipse is about 2.

Example 25

In example 25, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are $f_1=f_2=1$ kHz, $f_3=f_4=2$ kHz, $\varphi_1=\varphi_3=0°$, $\varphi_2=\varphi4=160°$, $V_1=V_2=10V$, $V_3=V_4=5V$. At this time, an interference fringe pattern obtained from the optical device as shown in FIG. 48, in which interference rings are ellipses and a ratio of a semi-major axis to a semi-minor axis of the ellipse is about 1/2.

Figure 47:
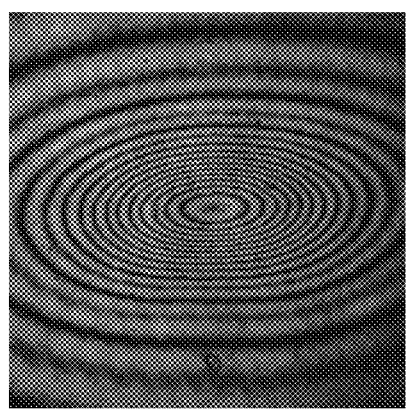
FIG. 47 is a schematic view of an interference fringe pattern obtained from the optical device of example 24.
Figure 48:
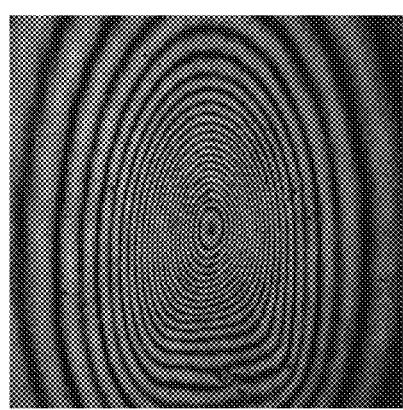
FIG. 48 is a schematic view of an interference fringe pattern obtained from the optical device of example 25.

By comparing FIG. 43 with FIG. 47 and FIG. 44 with FIG. 48, it can be concluded that the test result is substantially in consistent with the simulation result, thus, the optical device of the eighth embodiment is an elliptical lens with functions of an elliptical lens. However, there is some difference between the test result and the simulation result since the simulation of the distribution of the effective voltage in the liquid crystal layer is performed without considering electrical anisotropies of liquid crystal molecules and the uniformity of the thickness of the liquid crystal layer which may also affect the distribution of the voltage. Meanwhile, it can be seen that the impedance membrane of the physical optical device of FIG. 47 and FIG. 48 is scratched, which affects the shape of the distribution of the voltage of the optical device.

Ninth Embodiment

An optical device is provided in the ninth embodiment, including a first electrode layer, a first alignment layer, a liquid crystal layer, a second alignment layer, and a second electrode layer arranged in turn along a light transmission direction. The first electrode layer includes a first electrode, a second electrode, and a first impedance membrane arranged between the first electrode and the second electrode. The first electrode and the second electrode are respectively arranged on opposite ends of the first impedance membrane. The second electrode layer includes a third electrode, a fourth electrode, and a second impedance membrane arranged between the third electrode and the fourth electrode. The third electrode and the fourth electrode are respectively arranged on opposite ends of the second impedance membrane. The first electrode, the second electrode, the third electrode, and the fourth electrode form a light transmission hole shaped as a parallelogram along the light transmission direction, and alternating voltages obtained from the first electrode, the second electrode, the third electrode, and the fourth electrode satisfy the following formulas.

$$\frac{V_1^2}{2L_1^2} + \frac{V_2^2}{2L_1^2} - \frac{V_1 V_2 \cos(\varphi_1 - \varphi_2)}{L_1^2} = 0$$

$$\frac{V_3^2}{2L_2^2} + \frac{V_4^2}{2L_2^2} - \frac{V_3 V_4 \cos(\varphi_3 - \varphi_4)}{L_2^2} \neq 0$$

Wherein $L_1$ is a distance between the first electrode and the second electrode, $L_2$ is a distance between the third electrode and the fourth electrode, $V_1$ and $\varphi_1$ are respectively an amplitude and an initial phase of the alternating voltage obtained from the first electrode, $V_2$ and $\varphi_2$ are respectively an amplitude and an initial phase of the alternating voltage obtained from the second electrode, $V_3$ and $\varphi_3$ are respectively an amplitude and an initial phase of the alternating voltage obtained from the third electrode, and $V_4$ and $\varphi_4$ are respectively an amplitude and an initial phase of the alternating voltage obtained from the fourth electrode.

According to the formula (1-22), when $m_1 \neq 0$, $m_2 = 0$, the following formula can be obtained:

$$V_{rms}^2 = m_1\left(x + \frac{n_1}{2m_1}\right)^2 + n_2 y - \frac{n_1^2}{4m_1^2} + \frac{V_1^2 + V_3^2}{2} \quad (1\text{-}27)$$

At this time, the distribution of the effective voltage in the liquid crystal layer of the optical device is shaped as a paraboloid and a symmetrical axis of the paraboloid is at $$\left(-\frac{n_1}{2m_1}, y\right).$$

According to the formula (1-22), when $m_1 \neq 0$, $m_2 = 0$, the following formula can be obtained:

$$V_{rms}^2 = m_2\left(y + \frac{n_2}{2m_2}\right)^2 + n_1 x - \frac{n_2^2}{4m_2^2} + \frac{V_1^2 + V_3^2}{2} \quad (1\text{-}28)$$

At this time, the distribution of the effective voltage in the liquid crystal layer of the optical device is shaped as a paraboloid and a symmetrical axis of the paraboloid is at $$\left(x, -\frac{n_2}{2m_2}\right).$$

Example 26

Figure 49:
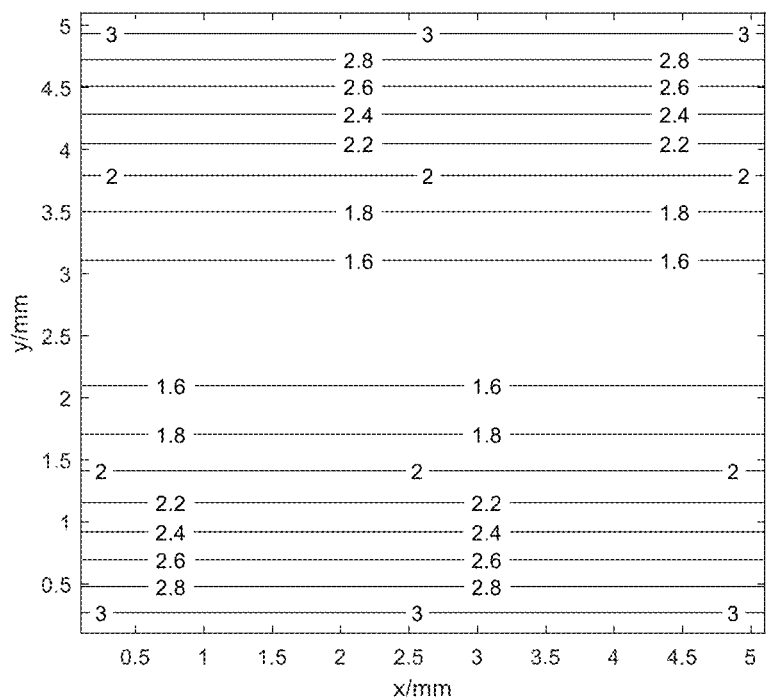
FIG. 49 is a schematic view showing a distribution of equipotential lines in a liquid crystal layer of an optical device of example 26.
Figure 52:
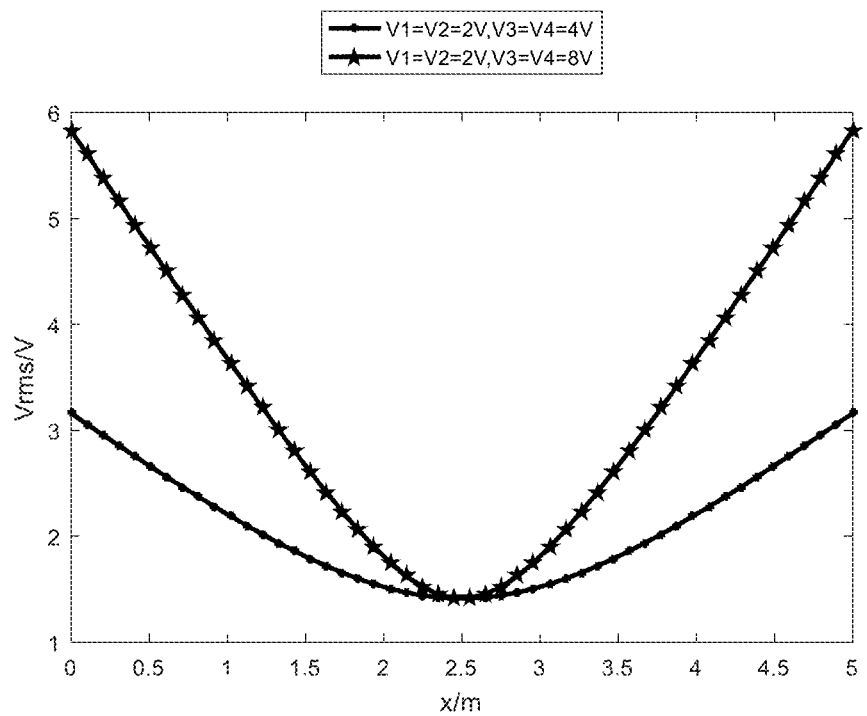
FIG. 52 is a schematic view showing a relationship between Vans and an x coordinate in a liquid crystal layer of the optical device of examples 27 and 28.

In example 26, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=\varphi_2=0°$, $\varphi_4=180°$, $V_1=V_2=2V$, $V_3=V_4=4V$. According to the formula (1-20), at this time $m_1=0$. According to the formula (1-28), it can be concluded that the distribution of the equipotential lines in the liquid crystal layer is shaped as a paraboloid and a symmetrical axis of the paraboloid is at (x, 5/2 mm). The distribution of the equipotential lines of the liquid crystal layer is as shown in FIG. 49 by simulating the liquid crystal layer through the formula (1-8). It can be concluded from the formula (1-28) that $V_{rms}$ in the liquid crystal layer of the optical device is not related with the y coordinate. $V_{rms}$ corresponding to each x coordinate is calculated according to the formula (1-28) and the relationship between each $V_{rms}$ and x coordinate is as shown in FIG. 52.

Example 27

Figure 50:
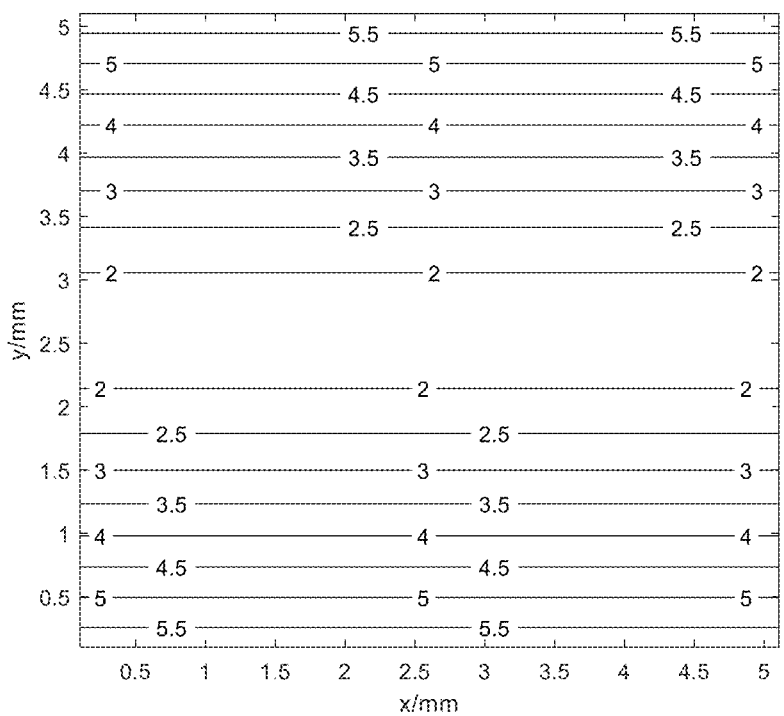
FIG. 50 is a schematic view showing a distribution of equipotential lines in a liquid crystal layer of an optical device of example 27.

In example 27, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=\varphi_2=0°$, $\varphi_4=180°$, $V_1=V_2=2V$, $V_3=V_4=8V$. According to the formula (1-20), at this time $m_1=0$. According to the formula (1-28), it can be concluded that the distribution of the equipotential lines in the liquid crystal layer is shaped as a paraboloid and a symmetrical axis of the paraboloid is at (x, 5/2 mm). The distribution of the equipotential lines of the liquid crystal layer is as shown in FIG. 50 by simulating the liquid crystal layer through the formula (1-8). It can be concluded from the formula (1-28) that $V_{rms}$ in the liquid crystal layer of the optical device is not related with the y coordinate. $V_{rms}$ corresponding to each x coordinate is calculated according to the formula (1-28) and the relationship between each $V_{rms}$ and x coordinate is as shown in FIG. 51.

Figure 51:
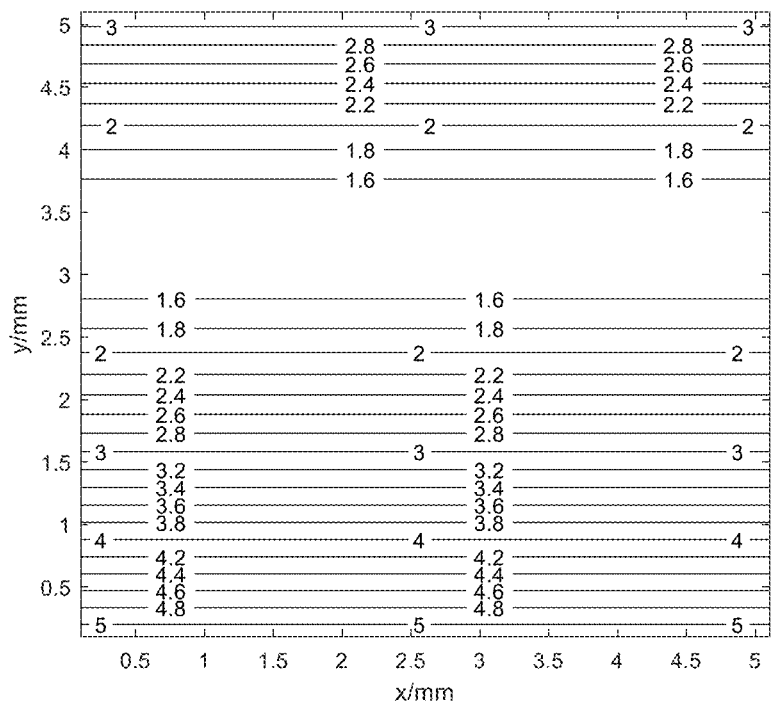
FIG. 51 is a schematic view showing a distribution of equipotential lines in a liquid crystal layer of an optical device of example 28.

It can be concluded from FIG. 51 that the distributions of $V_{rms}$ in the liquid crystal layer of the optical devices of examples 26 and 27 are respectively shaped as a paraboloid. Since the arrangement of liquid crystal molecules are determined by the driving voltage, thus, the optical devices of examples 26 and 27 are respectively shaped being cylindrical as the paraboloid.

Example 28

In example 28, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=\varphi_2=0°$, $\varphi_4=180°$, $V_1=V_2=2V$, $V_3=7V$, $V_4=4V$. According to the formula (1-20), at this time $m_1=0$. According to the formula (1-28), it can be concluded that the distribution of the equipotential lines in the liquid crystal layer is shaped as a paraboloid and a symmetrical axis of the paraboloid is at (x, 35/11 mm). The distribution of the equipotential lines of the liquid crystal layer is as shown in FIG. 51 by simulating the liquid crystal layer through the formula (1-8).

Example 29

In example 29, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=1$ kHz, $f_3=f_4=2$ kHz, $\varphi_1=\varphi_3=\varphi_2=0°$, $\varphi_4=180°$, $V_1=V_2=2V$, $V_3=5V$, $V_4=7V$. According to the formula (1-20), at this time $m_1=0$. According to the formula (1-28), it can be concluded that the distribution of the equipotential lines in the liquid crystal layer is shaped as a paraboloid and a symmetrical axis of the paraboloid is at (x, 25/12 mm)). The distribution of the equipotential lines of the liquid crystal layer is as shown in FIG. 53 by simulating the liquid crystal layer through the formula (1-8).

It can be concluded from FIG. 52 that when the voltage applied to each electrode of the optical device satisfies: $m_1=0$ and $m_2\neq 0$, the distribution of $V_{rms}$ in the liquid crystal layer is shaped as a paraboloid with x coordinates. When the amplitudes of the voltages applied to the same substrate are equal to each other, the rotation axis of the optical device is at (x, 5/2). An optical power of the cylindrical optical device in the x axis direction can be changed by changing the amplitudes of the voltages applied to one substrate. When the amplitudes of the voltages applied to one substrate are equal to each other and the phase difference between the voltages is 0, and the amplitudes of the voltages applied to the other substrate are different from each other and the phase difference between the voltages is not 0, the symmetrical axis of the cylindrically-shaped distribution is at $(x,-n_2/2\ m_2)$ and is changed as the amplitudes of the voltages applied to the other substrate change.

Similarly, when the voltage applied to each electrode satisfies: $m_2=0$ and $m_1\neq 0$, the distribution of the equipotential lines in the liquid crystal layer along the y axis is shaped as a paraboloid. When the amplitudes of the voltages applied to the same substrate are equal to each other, the rotation axis of the optical device is at (5/2,y), and the optical power of the cylindrical optical device along the y axis direction can be adjusted by changing the amplitudes of the voltages applied to one substrate.

Example 30

In example 30, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are $f_1=f_2=1$ kHz, $f_3=f_4=2$ kHz, $\varphi_1=\varphi_3=\varphi_2=0°$, $\varphi_4=180°$, $V_1=V_2=3V$, $V_3=V_4=6V$. At this time, an interference fringe pattern obtained from the optical device under red light having a wavelength of 632.8 nm as shown in FIG. 54. The interference fringes are distributed as stripes and a lens center of the cylindrical optical device is about at a laterally-symmetrical center of the square light transmission hole.

Example 31

In example 31, a test is performed based on the physical optical device of example 3. Voltages in the formulas (1-1), (1-2), (1-3), and (1-4) are respectively applied to the first electrode, the second electrode, the third electrode, the fourth electrode of the optical device of example 3, and parameters of the voltages are $f_1=f_2=1$ kHz, $f_3=f_4=2$ kHz, $\varphi_1=\varphi_3=\varphi_2=0°$, $\varphi_4=180°$, $V_1=V_2=3V$, $V_3=V_4=9V$. At this time, an interference fringe pattern obtained from the optical device with red light having a wavelength of 632.8 nm is as shown in FIG. 55. The interference fringes are distributed as stripes and a lens center of the cylindrical optical device is about at a laterally-symmetrical center of the square light transmission hole.

By comparing FIG. 49 with FIG. 54, FIG. 50 with FIG. 55, it can be seen that the test result is substantially in consistent with the simulation result, thus, the optical device of the ninth embodiment is a cylindrical lens having the functions of cylindrical lens. However, there is some difference between the test result and the simulation result since the simulation of the distribution of the effective voltage in the liquid crystal layer is performed without considering electrical anisotropies of liquid crystal molecules and the uniformity of the thickness of the liquid crystal layer which may also affect the distribution of the voltage.

Tenth Embodiment

An optical device is provided in the tenth embodiment, including a first electrode layer, a first alignment layer, a liquid crystal layer, a second alignment layer, and a second electrode layer arranged in turn along a light transmission direction. The first electrode layer includes a first electrode, a second electrode, and a first impedance membrane arranged between the first electrode and the second electrode. The first electrode and the second electrode are respectively arranged on opposite ends of the first impedance membrane. The second electrode layer includes a third electrode, a fourth electrode, and a second impedance membrane arranged between the third electrode and the fourth electrode. The third electrode and the fourth electrode are respectively arranged on opposite ends of the second impedance membrane. The first electrode, the second electrode, the third electrode, and the fourth electrode form a light transmission hole shaped as a parallelogram along the light transmission direction, and alternating voltages obtained from the first electrode, the second electrode, the third electrode, and the fourth electrode have same frequencies.

According to the formulas (1-10), (1-11), (1-12), and (1-13), when $f_1=f_2=f_3=f_4=f$ (that is, the voltages applied to the optical device have the same frequencies):

$$F_A(V_1,t,f,0)=V_1\sin(2\pi ft) \quad (1\text{-}29)$$

$$F_B(V_2,t,f,\varphi_{12})=V_2\sin(2\pi ft+\varphi_{12}) \quad (1\text{-}30)$$

$$F_C(V_3,t,f,0)=V_3\sin(2\pi ft) \quad (1\text{-}31)$$

$$F_D(V_4,t,f,\varphi_{34})=V_4\sin(2\pi ft+\varphi_{34}) \quad (1\text{-}32)$$

Then a potential distribution $V_{up}$ of an upper substrate and a potential distribution $V_{down}$ of a lower substrate are:

$$V_{up}=V_1\sin(2\pi ft)+\frac{x}{L_1}[V_2\sin(2\pi ft+\varphi_{12})-V_1\sin(2\pi ft)] \quad (1\text{-}33)$$

$$V_{down}=V_3\sin(2\pi ft)+\frac{y}{L_2}[V_4\sin(2\pi ft+\varphi_{34})-V_3\sin(2\pi ft)] \quad (1\text{-}34)$$

$$U=V_1\sin(2\pi ft)+\frac{x}{L_1}[V_2\sin(2\pi ft+\varphi_{12})-V_1\sin(2\pi ft)]- \quad (1\text{-}35)$$
$$V_3\sin(2\pi ft)-\frac{y}{L_2}[V_4\sin(2\pi ft+\varphi_{34})-V_3\sin(2\pi ft)]$$

When $$a=\left(1-\frac{x}{L_1}\right)V_1,\ b=\frac{x}{L_1}V_2,\ c=-\left(1-\frac{y}{L_2}\right)V_3,\ d=-\frac{y}{L_2}V_4,$$

then:

$$V_{rms}^2 = \frac{\int_0^T U^2 dt}{T} \quad (1\text{-}36)$$

$$= \frac{1}{2}(a^2 + c^2 + b^2 + d^2 - 2ac) + b(a-c)\cos(\varphi_{12}) - bd\cos(\varphi_{12} - \varphi_{34}) + d(c-a)\cos(\varphi_{34})$$

Wherein $$T = \frac{1}{f}.$$

Plugging $$a = \left(1 - \frac{x}{L_1}\right)V_1,\ b = \frac{x}{L_1}V_2,\ c = -\left(1 - \frac{y}{L_2}\right)V_3,\ \text{and}\ d = -\frac{y}{L_2}V_4$$

into the formula (1-36), then:

$$V_{rms}^2 = \left[\frac{V_1^2}{2L_1^2} + \frac{V_2^2}{2L_1^2} - \frac{V_1 V_2}{L_1^2}\cos(\varphi_{12})\right]x^2 + \left[-\frac{V_1^2}{L_1} + \frac{V_1 V_3}{L_1} + \frac{V_1 V_2 \cos(\varphi_{12})}{L_1} - \frac{V_3 V_2 \cos(\varphi_{12})}{L_1}\right]x + \left[-\frac{V_1 V_3}{L_1 L_2} - \frac{V_2 V_4 \cos(\varphi_{12} - \varphi_{34})}{L_1 L_2} + \frac{V_1 V_4 \cos(\varphi_{34})}{L_1 L_2} + \frac{V_3 V_2 \cos(\varphi_{12})}{L_1 L_2}\right]xy + \left[\frac{V_3^2}{2L_2^2} + \frac{V_4^2}{2L_2^2} - \frac{V_3 V_4}{L_2^2}\cos(\varphi_{34})\right]y^2 + \left[-\frac{V_3^2}{L_2} + \frac{V_1 V_3}{L_2} - \frac{V_1 V_4 \cos(\varphi_{34})}{L_2} + \frac{V_3 V_4 \cos(\varphi_{34})}{L_2}\right]y + \frac{(V_1 - V_3)^2}{2} \quad (1\text{-}37)$$

When $\varphi_{12} = \varphi_{34} = \varphi$, variation gradients of the equipotential lines in the liquid crystal layer are:

$$\frac{dy}{dx} = \left\{\frac{V_1 V_3}{L_2} - \frac{V_3^2}{L_2} - \frac{V_1 V_4 \cos(\varphi)}{L_2} + \frac{V_3 V_4 \cos(\varphi)}{L_2} + \left[-\frac{V_1 V_3}{L_1 L_2} - \frac{V_2 V_4}{L_1 L_2} + \frac{V_2 V_3 \cos(\varphi)}{L_1 L_2} + \frac{V_1 V_4 \cos(\varphi)}{L_1 L_2}\right]x + \left[\frac{V_3^2}{L_2^2} + \frac{V_4^2}{L_2^2} - \frac{2V_3 V_4 \cos(\varphi)}{L_2^2}\right]y\right\} / \left\{\frac{V_1 V_3}{L_1} - \frac{V_1^2}{L_1} - \frac{V_2 V_3 \cos(\varphi)}{L_1} + \frac{V_1 V_2 \cos(\varphi)}{L_2} + \left[-\frac{V_1 V_3}{L_1 L_2} - \frac{V_2 V_4}{L_1 L_2} + \frac{V_2 V_3 \cos(\varphi)}{L_1 L_2} + \frac{V_1 V_4 \cos(\varphi)}{L_1 L_2}\right]y + \left[\frac{V_1^2}{L_1^2} + \frac{V_2^2}{L_1^2} - \frac{2V_1 V_2 \cos(\varphi)}{L_1^2}\right]x\right\} \quad (1\text{-}38)$$

When the amplitudes of the voltages applied to two ends of the substrate are equal to each other ($V_1=V_2$, $V_3=V_4$), the formula (1-37) can be simplified as:

$$V_{rms}^2 = \quad (1\text{-}39)$$
$$\frac{V_1^2}{L_1^2}[1-\cos(\varphi)]x^2 + \left\{-\frac{V_1^2}{L_1}[1-\cos(\varphi)] + \frac{V_1 V_3}{L_1}[1-\cos(\varphi)]\right\}x +$$
$$-2\frac{V_1 V_3}{L_1 L_2}[1-\cos(\varphi)]xy + \frac{V_3^2}{L_2^2}[1-\cos(\varphi)]y^2 +$$
$$\left\{-\frac{V_3^2}{L_2}[1-\cos(\varphi)] + \frac{V_1 V_3}{L_2}[1-\cos(\varphi)]\right\}y + \frac{(V_1 - V_3)^2}{2}$$

A variation gradient of $V_{rms}$ is:

$$\frac{dy}{dx} = -\frac{L_1 V_4}{L_2 V_2} \quad (1\text{-}40)$$

When $V_1 = V_2 = V_3 = V_4 = V$, the formula (1-37) is changed to be:

$$V_{rms}^2 = [1-\cos(\varphi)]V^2\left(\frac{x}{L_1} - \frac{y}{L_2}\right)^2 \quad (1\text{-}41)$$

At this time, the distribution of the effective voltage in the liquid crystal layer of the optical device is shaped as a prism.

Example 32

Figure 56:
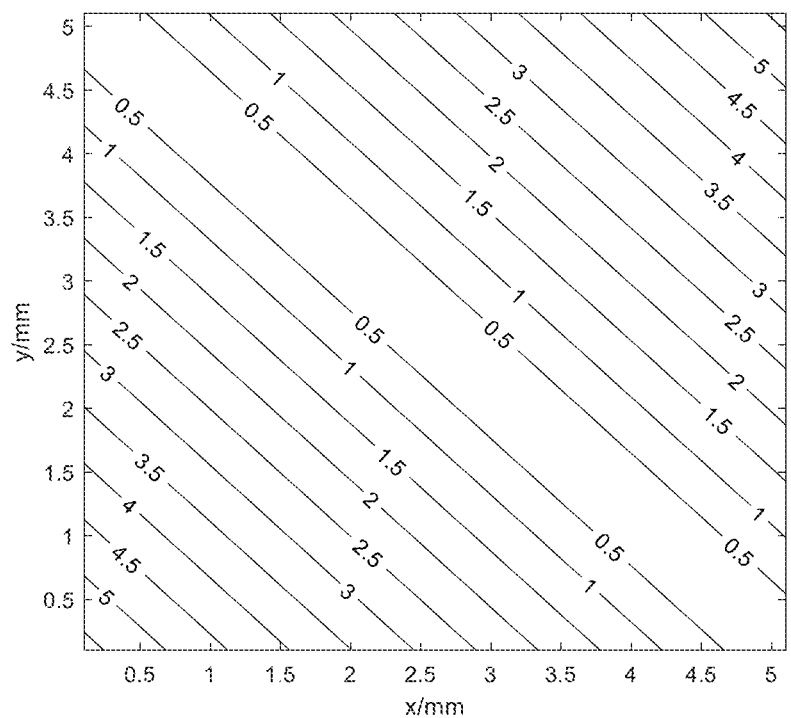
FIG. 56 is a schematic view showing a distribution of equipotential lines in a liquid crystal layer of an optical device of example 32.

In example 32, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=f_3=f_4=1$ kHz, $\varphi_1=\varphi_3=0°$, $\varphi_2=\varphi_4=180°$, $V_1=V_2=V_3=V_4=4V$. The distribution of the equipotential lines of the liquid crystal layer is shaped as a prism as shown in FIG. 56 by simulating the liquid crystal layer through the formula (1-8), wherein the variation gradient of the voltage is dy/dx=−1.

Example 33

Figure 57:
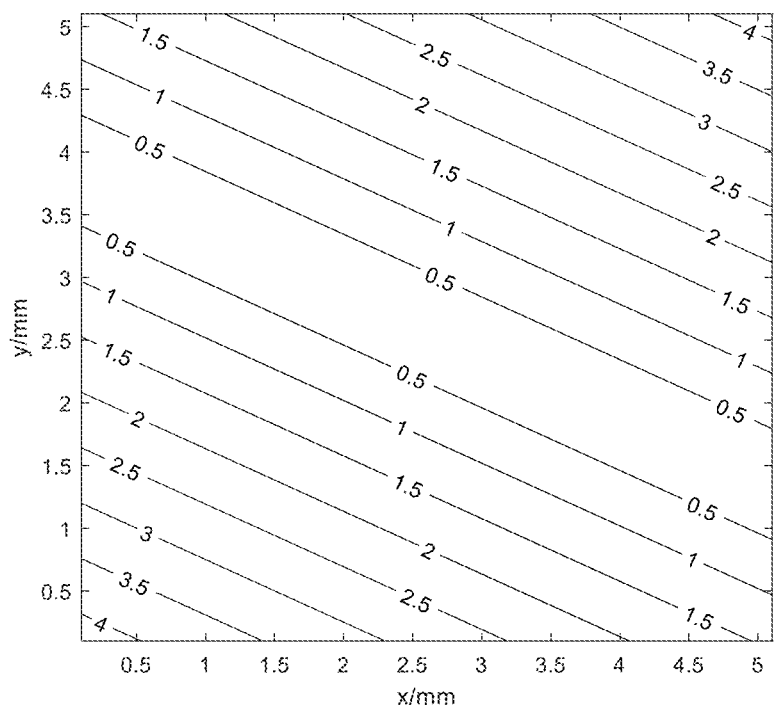
FIG. 57 is a schematic view showing a distribution of equipotential lines in a liquid crystal layer of an optical device of example 33.

In example 33, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=f_3=f_4=1$ kHz, $\varphi_1=\varphi_3=0°$, $\varphi_2=\varphi_4=180°$, $V_1=V_2=2V$, $V_3=V_4=4V$. The distribution of the equipotential lines of the liquid crystal layer is shaped as a prism as shown in FIG. 57 by simulating the liquid crystal layer through the formula (1-8), wherein the variation gradient of the voltage is dy/dx=−1/2.

Example 34

Figure 58:
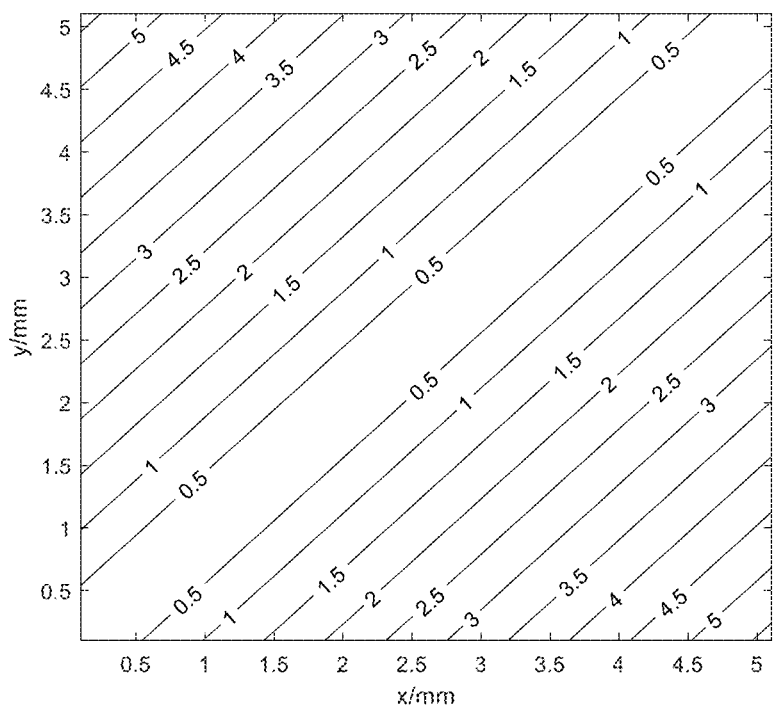
FIG. 58 is a schematic view showing a distribution of equipotential lines in a liquid crystal layer of an optical device of example 34.

In example 34, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=f_3=f_4=1$ kHz, $\varphi_2=\varphi_3=0°$, $\varphi_1=\varphi_4=180°$, $V_1=V_2=V_3=V_4=4V$. The distribution of the equipotential lines of the liquid crystal layer is shaped as a prism as shown in FIG. 58 by simulating the liquid crystal layer through the formula (1-8), wherein the variation gradient of the voltage is dy/dx=1.

Example 35

Figure 59:
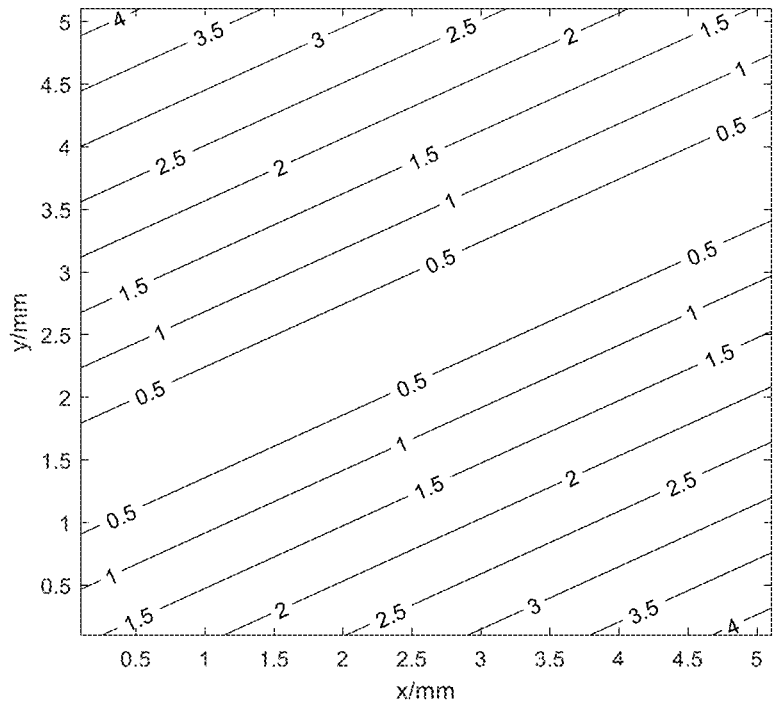
FIG. 59 is a schematic view showing a distribution of equipotential lines in a liquid crystal layer of an optical device of example 35.

In example 35, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=f_3=f_4=1$ kHz, $\varphi_2=\varphi_3=0°$, $\varphi_1=\varphi_4=180°$, $V_1=V_2=V_3=V_4=4V$. The distribution of the equipotential lines of the liquid crystal layer is shaped as a prism as shown in FIG. 59 by simulating the liquid crystal layer through the formula (1-8), wherein the variation gradient of the voltage is dy/dx=1/2.

It can be concluded from FIG. 56 to FIG. 59 that when the frequencies of the voltages applied to the optical device are equal to each other, the distribution of the effective voltage in the liquid crystal layer is shaped as a prism and thus the refraction indexes of liquid crystal molecules are shaped being a prism. The variation gradient of the voltage can be changed by changing the amplitude of each voltage and thus directions of sides of the prism can be rotated.

Example 36

Figure 60:
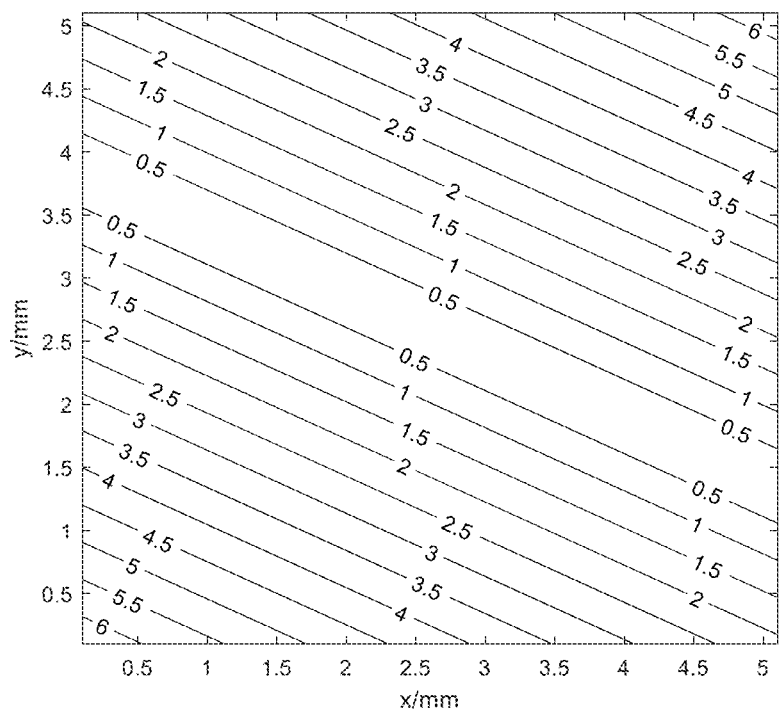
FIG. 60 is a schematic view showing a distribution of equipotential lines in a liquid crystal layer of an optical device of example 36.

In example 36, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=f_3=f_4=1$ kHz, $\varphi_1=\varphi_3=0°$, $\varphi_2=\varphi_4=180°$, $V_1=V_2=3V$, $V_3=V_4=6V$. The distribution of the effective voltage of the liquid crystal layer is shaped as a prism as shown in FIG. 60 by simulating the liquid crystal layer through the formula (1-8). When the y coordinate is 2.5 mm, $V_{rms}$ corresponding to each x coordinate in the liquid crystal layer can be calculated through the formula (1-39) and the relationship between each $V_{rms}$ and the corresponding x coordinate is as shown in FIG. 62.

Example 37

Figure 61:
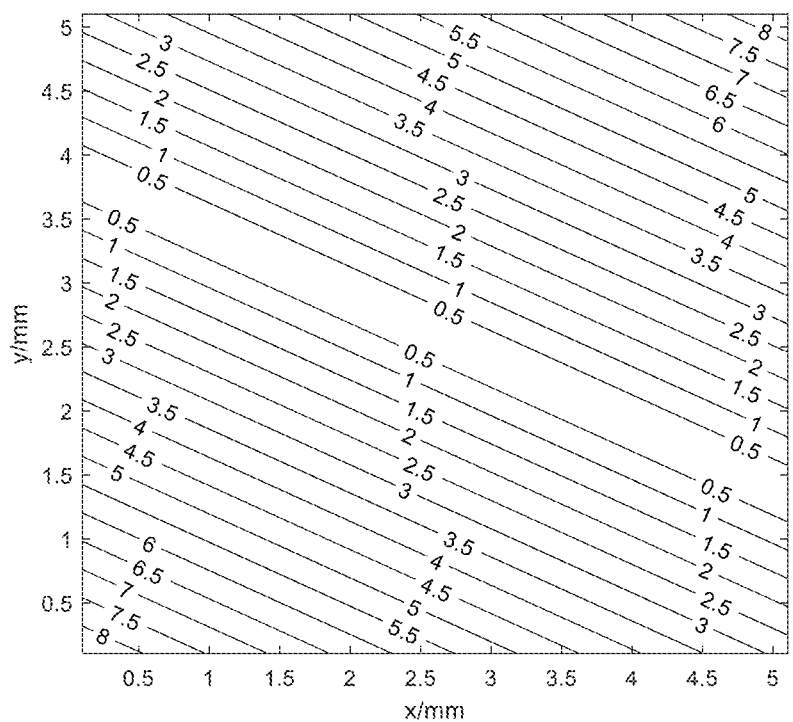
FIG. 61 is a schematic view showing a distribution of equipotential lines in a liquid crystal layer of an optical device of example 37.

In example 37, a simulation is performed based on the optical device of example 2. Alternating voltages in formulas (1-1), (1-2), (1-3), and (1-4) are respectively applied to the first electrode, the second electrode, the third electrode, and the fourth electrode. Parameters of the voltages are respectively $f_1=f_2=f_3=f_4=1$ kHz, $\varphi_1=\varphi_3=0°$, $\varphi_2=\varphi_4=180°$, $V_1=V_2=4V$, $V_3=V_4=8V$. The distribution of the effective voltage of the liquid crystal layer is shaped as a prism as shown in FIG. 61 by simulating the liquid crystal layer through the formula (1-8). When the y coordinate is 2.5 mm, $V_{rms}$ corresponding to each x coordinate in the liquid crystal layer can be calculated through the formula (1-39) and the relationship between each $V_{rms}$ and the corresponding x coordinate is as shown in FIG. 62.

Figure 62:
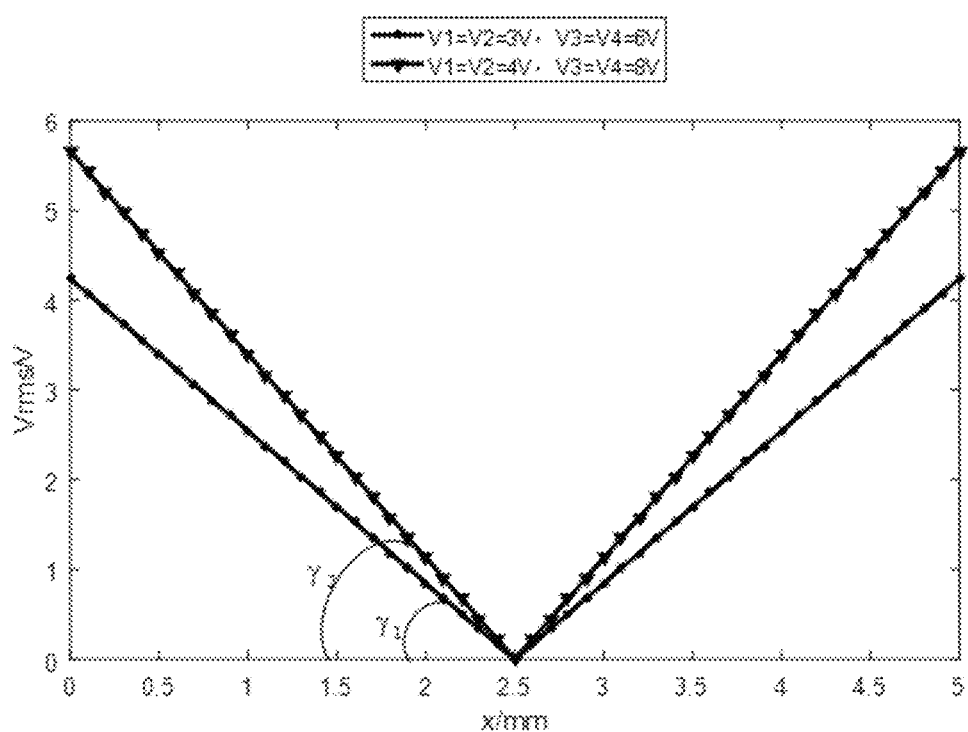
FIG. 62 is a schematic view showing a relationship between $V_{rms}$ and an x coordinate in a liquid crystal layer of an optical device of examples 36 and 37.

It can be concluded from FIG. 62 that, in examples 36 and 37, the distribution of $V_{rms}$ in the liquid crystal layer of the optical device along the x axis is shaped as a bent line. Since the arrangement of liquid crystal molecules is determined by the driving voltage, the optical devices of examples 36 and 37 are prisms having the same shape as the bent line.

It can be concluded from FIG. 60 and FIG. 61 that when the frequencies of the voltages applied to the optical device are equal to each other, the distribution of the effective voltage in the liquid crystal layer is shaped as a prism, and thus refraction indexes of liquid crystal molecules are also shaped as a prism, therefore, the optical device of the tenth embodiment is a prism. From FIG. 60 to FIG. 62, it can be concluded that when the directions of the sides (slope) of the optical device (prism) are fixed, a base angle γ of the optical device (prism) can be changed by increasing the amplitude of each voltage in the same proportion and thus decreasing the distance between two adjacent equipotential lines. As shown in FIG. 62, $\gamma_1$ is a base angle of the optical device (prism) of example 36 and $\gamma_2$ is a base angle of the optical device (prism) of example 37.

The optical device, the imaging device, the focus driving method and the method for moving a lens center of an optical device of the present invention are illustrated in detail as above. The principle and embodiment of the present invention are illustrated through concrete examples which are only used to make the method and key thought of the present invention understand. One skilled in the art should know that what mentioned above are only the embodiments of the present invention, which are not to limit the scope of the patent of the present invention. Any equivalent structure or equivalent transformation of the procedure made with the specification and the pictures attached of the present invention, or directly or indirectly using the specification and the pictures attached of the present invention into other relevant technical fields, is included in the scope of the patent protection of the present invention.

What is claimed is:

1. A method for moving a lens center of an optical device, wherein the optical device comprises a first electrode layer, a first alignment layer, a liquid crystal layer, a second alignment layer, and a second electrode layer being arranged in turn along a light transmission direction;
the first electrode layer comprises a first electrode, a second electrode, and a first impedance membrane arranged between the first electrode and the second electrode, and the first electrode and the electrode are respectively on opposite ends of the first impedance;
the second electrode layer comprises a third electrode, a fourth electrode, and a second impedance membrane arranged between the third electrode and the fourth electrode, and the third electrode and the fourth electrode are respectively arranged on opposite ends of the second impedance membrane; the first electrode, the second electrode, the third electrode, and the fourth electrode form a light transmission hole being shaped as a parallelogram; and
the method for moving a lens center of an optical device comprises:
applying alternating voltages to the first electrode, the second electrode, the third electrode, and the fourth electrode, wherein the lens center of the optical is in a first position, and a coordinate of the lens center of the optical device is:

$$\left( \frac{2V_1[V_1 - V_2\cos(\varphi_1 - \varphi_2)]}{V_1^2 + V_2^2 - 2V_1V_2\cos(\varphi_1 - \varphi_2)} \cdot \frac{L_1}{2}, \frac{2V_3[V_3 - V_4\cos(\varphi_3 - \varphi_4)]}{V_3^2 + V_4^2 - 2V_3V_4\cos(\varphi_3 - \varphi_4)} \cdot \frac{L_2}{2} \right),$$

changing $V_1$, $V_2$, $V_3$, $V_4$, $\varphi_1$, $\varphi_2$, $\varphi_3$ and/or $\varphi_4$ such that the lens center of the optical device is in a second position, wherein $L_1$ is a distance between the first electrode and the second electrode, $L_2$ is a distance between the third electrode and the fourth electrode, $V_1$ and $\varphi_1$ are respectively an amplitude and an initial phase of the alternating voltage obtained from the first electrode, $V_2$ and $\varphi_2$ are respectively an amplitude and an initial phase the alternating voltage obtained from the second electrode, $V_3$ and $\varphi_3$ are respectively an amplitude and an initial phase of the alternating voltage obtained from the third electrode, and $V_4$ and $\varphi_4$ are respectively an amplitude and an initial phase of the alternating voltage obtained from the fourth electrode;

wherein the optical device is a round lens.

2. The method for moving a lens center of an optical device, as recited in claim 1, wherein the optical device is the round lens, distribution of equipotential lines in the liquid crystal layer of the round lens is shaped as a circle.

* * * * *